United States Patent
Fleming-Mwanyoha

(10) Patent No.: US 11,948,318 B1
(45) Date of Patent: Apr. 2, 2024

(54) SYSTEM AND METHODS FOR OPTIMAL PRECISION POSITIONING USING MINIMUM VARIANCE SUB-SAMPLE OFFSET ESTIMATION

(71) Applicant: Sadiki Pili Fleming-Mwanyoha, Cambridge, MA (US)

(72) Inventor: Sadiki Pili Fleming-Mwanyoha, Cambridge, MA (US)

(*) Notice: Subject to any disclaimer, the term of this patent is extended or adjusted under 35 U.S.C. 154(b) by 569 days.

(21) Appl. No.: 17/246,760

(22) Filed: May 3, 2021

Related U.S. Application Data

(63) Continuation-in-part of application No. 16/221,573, filed on Dec. 16, 2018, now Pat. No. 11,024,001.

(51) Int. Cl.
*G06T 7/73* (2017.01)
*G06T 7/593* (2017.01)
*G06T 7/80* (2017.01)

(52) U.S. Cl.
CPC ............... *G06T 7/593* (2017.01); *G06T 7/73* (2017.01); *G06T 7/85* (2017.01); *G06T 2207/10012* (2013.01); *G06T 2207/10021* (2013.01)

(58) Field of Classification Search
CPC ........ G01S 13/06; G01S 13/103; G01S 15/08; G01S 15/101; G01S 17/08; G06T 7/593; G06T 7/73; G06T 7/85
See application file for complete search history.

(56) References Cited

U.S. PATENT DOCUMENTS

| | | | |
|---|---|---|---|
| 2009/0303055 A1* | 12/2009 | Anderson et al. | ... G08B 21/086 340/573.6 |
| 2019/0378297 A1* | 12/2019 | Nilsson | ..................... G06T 7/74 |

FOREIGN PATENT DOCUMENTS

WO    WO-2022235528 A2 * 11/2022

* cited by examiner

*Primary Examiner* — Andrew W Johns

(57) ABSTRACT

A system and methods for attaining optimal precision direction and ranging through air and across a refractive boundary separating air from a liquid or plasma using stereo-camera and time-of-flight techniques, and employing minimum variance sub-sample offset estimation. The system and methods can also track measurement and estimation variances as they propagate through the system in order to provide a comprehensive precision analysis of all estimated quantities.

3 Claims, 28 Drawing Sheets

| | |
|---|---|
| $\omega = \dfrac{2\pi k}{N} \quad \mid \quad k \in \mathbb{N} \wedge k \in [0, N]$ | 439 |
| Let $i \in \mathbb{N} \wedge i \in [1, M]$ | 440 |
| $L_i(k) = R_i(k) e^{-\frac{j2\pi k}{N} P} + z_i(k)$ | 441 |
| Let $z_i \in \mathbb{C} \wedge z_i \perp R_i$ | 442 |
| $z_i = \begin{pmatrix} \Re_z \\ \Im_z \end{pmatrix} \sim N\left( \begin{pmatrix} 0 \\ 0 \end{pmatrix}, \begin{pmatrix} \sigma_z^2/2 & 0 \\ 0 & \sigma_z^2/2 \end{pmatrix} \right)$ i.i.d. | 443 |
| Let $P \in \mathbb{N} \wedge P \in [0, N]$ | 444 |
| $X(k) \stackrel{\text{def}}{=} E[L_i(k) \cdot R_i^*(k)]$ | 445 |
| $\widehat{X}(k) = \widehat{\sigma_{LR}}(k) \approx E[L_i(k) \cdot R_i^*(k)]$ | 446 |
| $\widehat{\sigma_{LR}}(k) = \dfrac{1}{M} \sum_{i=1}^{M} L_i(k) \cdot R_i^*(k)$ | 447 |
| $\hat{\rho}(n) = F^{-1}\left\{ \dfrac{\widehat{X}(k)}{|\widehat{X}(k)|} \right\}$ | 448 |
| $P_{\text{int}} \stackrel{\text{def}}{=} \underset{n}{\arg\max} \sum_{i=-1}^{1} \hat{\rho}_{(n+i) \bmod N} \quad n \in \mathbb{N} \wedge n < N$ | 449 |

FIG. 4F

| | |
|---|---|
| $\omega = \dfrac{2\pi k}{N} \quad \mid \quad k \in \mathbb{N} \ \wedge \ k \in (0, N/2)$ | 450 |
| Let $i \in \mathbb{N} \ \wedge \ i \in [1, M]$ | 440 |
| $L_i(k) = R_i(k) e^{-\frac{j2\pi k}{N} P} + z_i(k)$ | 441 |
| Let $z_i \in \mathbb{C} \ \wedge \ z_i \perp R_i$ | 442 |
| $z_i = \begin{pmatrix} \Re_z \\ \Im_z \end{pmatrix} \sim N\left( \begin{pmatrix} 0 \\ 0 \end{pmatrix}, \begin{pmatrix} \sigma_z^2/2 & 0 \\ 0 & \sigma_z^2/2 \end{pmatrix} \right)$ i.i.d. | 443 |
| Let $P \in \mathbb{R} \ \wedge \ P \in (-1, 1)$ | 451 |
| $H(k) \stackrel{\text{def}}{=} e^{-\frac{j2\pi k}{N} P}$ | 452 |
| $E[L_i(k) \cdot R_i^*(k)] = E[R_i(k) \cdot R_i^*(k)] \cdot H(k)$ | 453 |
| $\widehat{H}(k) = \dfrac{\widehat{\sigma_{LR}}(k)}{\widehat{\sigma_R^2}(k)} \approx \dfrac{E[L_i(k) \cdot R_i^*(k)]}{E[R_i(k) \cdot R_i^*(k)]}$ | 454 |
| $\widehat{\sigma_{LR}}(k) = \dfrac{1}{M} \sum_{i=1}^{M} L_i(k) \cdot R_i^*(k)$ | 447 |
| $\widehat{\sigma_R^2}(k) = \dfrac{1}{M} \sum_{i=1}^{M} R_i(k) \cdot R_i^*(k)$ | 455 |

FIG. 4G

| | |
|---|---|
| $\widehat{L}_i(k) = R_i(k) \cdot \widehat{H}(k)$ | 456 |
| $\widehat{z}_i(k) = L_i(k) - \widehat{L}_i(k)$ | 457 |
| $\widehat{\sigma}_z^2(k) = \frac{1}{M} \sum_{i=1}^{M} \widehat{z}_i(k) \cdot \widehat{z}_i^*(k)$ | 458 |
| $\widehat{\sigma}_H^2(k) = \widehat{\sigma}_z^2(k) \cdot \sum_{i=1}^{M} \left\| \frac{\partial \widehat{H}(k)}{\partial z_i(k)} \right\|^2 = \widehat{\sigma}_z^2(k) \cdot \sum_{i=1}^{M} \left\| \frac{\partial \widehat{H}(k)}{\partial L_i(k)} \right\|^2$ | 459 |
| $\widehat{\sigma}_H^2(k) = \frac{1}{M} \cdot \frac{\widehat{\sigma}_z^2(k)}{\widehat{\sigma}_R^2(k)}$ | 460 |
| $SNR_H(k) \stackrel{\text{def}}{=} \frac{|\widehat{H}(k)|^2}{\widehat{\sigma}_H^2(k)}$ | 461 |

FIG. 4H

| | |
|---|---|
| $\mu^2 \stackrel{\text{def}}{=} |\widehat{H}(k)|^2 = \mathfrak{R}_{\widehat{H}}^2 + \mathfrak{I}_{\widehat{H}}^2$ | 462 |
| $\sigma^2 \stackrel{\text{def}}{=} \frac{1}{2} \cdot \widehat{\sigma}_H^2(k)$ | 463 |
| $\begin{pmatrix} \mathfrak{R}_H \\ \mathfrak{I}_H \end{pmatrix} \sim N\left( \begin{pmatrix} \mathfrak{R}_{\widehat{H}} \\ \mathfrak{I}_{\widehat{H}} \end{pmatrix}, \begin{pmatrix} \sigma^2 & 0 \\ 0 & \sigma^2 \end{pmatrix} \right)$ | 464 |
| $p_\theta(\theta) = \frac{e^{-\sin^2(\theta)/2(\sigma^2/\mu^2)}}{2\sqrt{2\pi(\sigma^2/\mu^2)}} \cos(\theta) \left[ 1 + \Phi\left( \frac{\cos(\theta)}{\sqrt{2(\sigma^2/\mu^2)}} \right) \right] + \frac{e^{-1/2(\sigma^2/\mu^2)}}{2\pi}$ | 465 |
| $\theta \sim N(0, \sigma^2/\mu^2)$ | 472 |
| $\widehat{\sigma}_\theta^2(k) = \frac{1}{2} \cdot \frac{\widehat{\sigma}_H^2(k)}{|\widehat{H}(k)|^2} = \frac{1}{2 \cdot SNR_H(k)}$ | 473 |

FIG. 4I

| | |
|---|---|
| Let $s: q \to k \mid \widehat{\sigma_\theta^2}(s_q) \leq \widehat{\sigma_\theta^2}(s_{q+1}) \ \forall \ q \in \mathbb{N}, q \in [1, N/2-1]$ | 477 |
| $H(k) \stackrel{\text{def}}{=} e^{-\frac{j2\pi k}{N}P}$ | 452 |
| $\theta(k) \stackrel{\text{def}}{=} -P \cdot \omega(k) + \epsilon(k) \mid \omega(k) = \frac{2\pi k}{N}$ | 474 |
| Let $\epsilon_k \in \mathbb{R} \ \wedge \ \epsilon_k \perp \omega(k)$ | 475 |
| $\epsilon \sim N(0, \sigma_\epsilon^2)$ i.i.d. | 476 |
| $\hat{P} = \frac{\widehat{\sigma_{\theta\omega}}}{\widehat{\sigma_\omega^2}} \approx \frac{E[\theta(s_q) \cdot \omega(s_q)]}{E[\omega^2(s_q)]}$ | 479 |
| $\widehat{\sigma_{\theta\omega}} = \frac{1}{Q}\sum_{q=1}^{Q} \theta(s_q) \cdot \omega(s_q)$ | 480 |
| $\widehat{\sigma_\omega^2} = \frac{1}{Q}\sum_{q=1}^{Q} \omega^2(s_q)$ | 481 |
| $\widetilde{\sigma_P^2}(Q) = \sum_{q=1}^{Q} \widehat{\sigma_\theta^2}(s_q) \cdot \left|\frac{\partial \hat{P}}{\partial \theta(s_q)}\right|^2$ | 482 |
| $\widetilde{\sigma_P^2}(Q) = \frac{\sum_{q=1}^{Q} \widehat{\sigma_\theta^2}(s_q) \cdot \omega^2(s_q)}{\left(\sum_{q=1}^{Q} \omega^2(s_q)\right)^2}$ | 483 |
| $\frac{A(Q)}{B^2(Q)} \stackrel{\text{def}}{=} \widetilde{\sigma_P^2}(Q)$ | 484 |
| $A(0) = 0, \quad A(Q) = A(Q-1) + \widehat{\sigma_\theta^2}(s_Q) \cdot \omega^2(s_Q)$ | 485 |
| $B(0) = 0, \quad B(Q) = B(Q-1) + \omega^2(s_Q)$ | 486 |
| $Q_{opt} = \underset{Q \in [1, N/2-1]}{\operatorname{argmin}} \frac{A(Q)}{B^2(Q)}$ | 487 |

FIG. 4J

| | |
|---|---|
| $\theta(s_q) = \arctan\left(\dfrac{\Im\{\widehat{H}(s_q)\}}{\Re\{\widehat{H}(s_q)\}}\right) \quad \| \quad q \in \mathbb{N} \wedge q \in [1, Q_{opt}]$ | 478 |
| $\widehat{P} = \dfrac{\widehat{\sigma_{\theta\omega}}}{\widehat{\sigma}_\omega^2} \approx \dfrac{E[\theta(s_q)\cdot\omega(s_q)]}{E[\omega^2(s_q)]}$ | 479 |
| $\widehat{\sigma_{\theta\omega}} = \dfrac{1}{Q_{opt}}\sum_{q=1}^{Q_{opt}} \theta(s_q)\cdot\omega(s_q)$ | 488 |
| $\widehat{\sigma}_\omega^2 = \dfrac{1}{Q_{opt}}\sum_{q=1}^{Q_{opt}} \omega^2(s_q)$ | 489 |

FIG. 4K

| | |
|---|---|
| $\hat{\theta}(s_q) = -\widehat{P}\cdot\omega(s_q)$ | 490 |
| $\hat{\epsilon}(s_q) = \theta(s_q) - \hat{\theta}(s_q)$ | 491 |
| $\widehat{\sigma}_\epsilon^2 = \dfrac{1}{Q_{opt}}\sum_{q=1}^{Q_{opt}} \epsilon^2(s_q)$ | 492 |
| $\widehat{\sigma}_P^2 = \widehat{\sigma}_\epsilon^2 \cdot \sum_{q=1}^{Q_{opt}}\left\|\dfrac{\partial \widehat{P}}{\partial \epsilon(s_q)}\right\|^2 = \widehat{\sigma}_\epsilon^2 \cdot \sum_{q=1}^{Q_{opt}}\left\|\dfrac{\partial \widehat{P}}{\partial \theta(s_q)}\right\|^2$ | 493 |
| $\widehat{\sigma}_P^2 = \dfrac{1}{Q_{opt}}\cdot\dfrac{\widehat{\sigma}_\epsilon^2}{\widehat{\sigma}_\omega^2}$ | 494 |
| $P_{sub} \stackrel{\text{def}}{=} \widehat{P}$ | 495 |

FIG. 4L

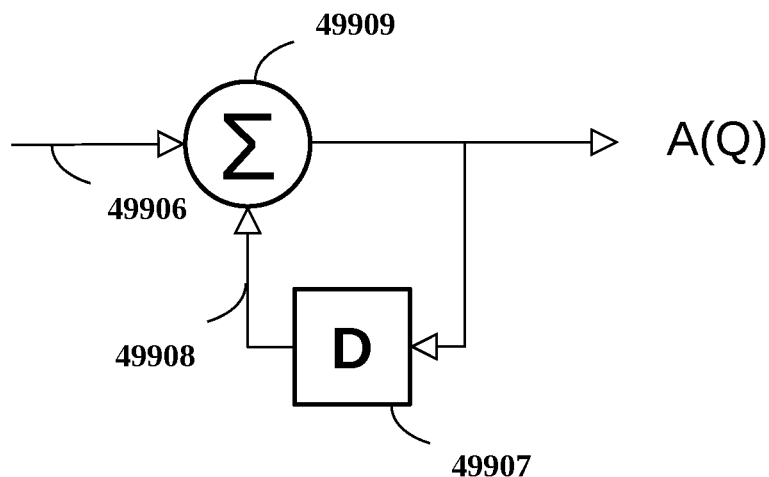
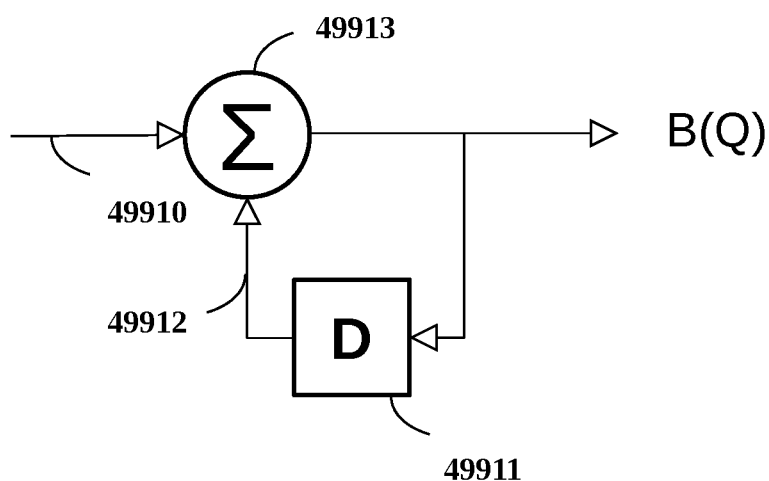
FIG. 4N

| | |
|---|---|
| $D_x = \dfrac{D}{\sqrt{1+\rho_y^2/\rho_x^2}}$ | 504 |
| $FOV_x = 2 \cdot \arctan\left(\dfrac{D_x}{2f}\right)$ | 505 |
| $\rho_\psi = \dfrac{FOV_x}{\rho_x}$ | 506 |
| $\psi = \rho_\psi \cdot (P_{int} + P_{sub})$ | 507 |
| $\widehat{\sigma_\psi^2} = \widehat{\sigma_P^2} \cdot \left\lvert \dfrac{\partial \psi}{\partial P_{sub}} \right\rvert^2$ | 508 |
| $\widehat{\sigma_\psi^2} = \widehat{\sigma_P^2} \cdot \rho_\psi^2$ | 509 |

FIG. 5B

| | |
|---|---|
| $r_{LOS} = \dfrac{\Delta \cdot \sin(\beta + \psi)}{\sin(\psi)}$ | 600 |
| $\widehat{\sigma_{LOS}^2} = \widehat{\sigma_\psi^2} \cdot \left|\dfrac{\partial r_{LOS}}{\partial \psi}\right|^2 + \widehat{\sigma_\beta^2} \cdot \left|\dfrac{\partial r_{LOS}}{\partial \beta}\right|^2$ | 601 |
| $\widehat{\sigma_{LOS}^2} = \widehat{\sigma_\psi^2} \cdot \left(\dfrac{\Delta \cdot \cos(\beta+\psi)}{\sin(\psi)} - \dfrac{\Delta \cdot \sin(\beta+\psi) \cdot \cos(\psi)}{\sin^2(\psi)}\right)^2 + \widehat{\sigma_\beta^2} \cdot \left(\dfrac{\Delta \cdot \cos(\beta + \psi)}{\sin(\psi)}\right)^2$ | 602 |

FIG. 6A

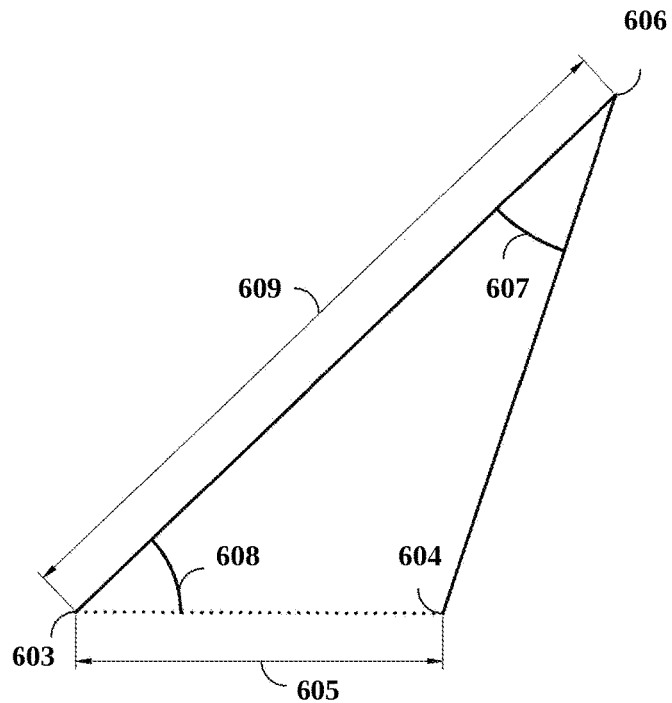

FIG. 6B

| | |
|---|---|
| Let $\phi \in (-\pi/2, \pi/2)$ | 700 |
| $a = h + r_{LOS} \cdot \sin(\phi)$ | 701 |
| $r = r_{LOS} \cdot \cos(\phi)$ | 702 |

FIG. 7A

| | |
|---|---|
| $\widehat{\sigma_{LOS}^2} = \widehat{\sigma_\psi^2} \cdot \left( \dfrac{\Delta \cdot \cos(\beta+\psi)}{\sin(\psi)} - \dfrac{\Delta \cdot \sin(\beta+\psi) \cdot \cos(\psi)}{\sin^2(\psi)} \right)^2 + \widehat{\sigma_\beta^2} \cdot \left( \dfrac{\Delta \cdot \cos(\beta+\psi)}{\sin(\psi)} \right)^2$ | 602 |
| $\sigma_h^2 \overset{\text{def}}{=} \sigma_{user}^2$ | 703 |
| $\sigma_\phi^2 = \sigma_G^2$ | 704 |

FIG. 7B

| | |
|---|---|
| $\sigma_a^2 = \left\| \dfrac{\partial a}{\partial r_{LOS}} \right\|^2 \cdot \sigma_{LOS}^2 + \left\| \dfrac{\partial a}{\partial h} \right\|^2 \cdot \sigma_h^2 + \left\| \dfrac{\partial a}{\partial \phi} \right\|^2 \cdot \sigma_\phi^2$ | 705 |
| $\dfrac{\partial a}{\partial r_{LOS}} = \sin(\phi)$ | 706 |
| $\dfrac{\partial a}{\partial h} = 1$ | 707 |
| $\dfrac{\partial a}{\partial \phi} = r_{LOS} \cdot \cos(\phi)$ | 708 |

FIG. 7C

| | |
|---|---|
| $\sigma_r^2 = \left|\dfrac{\partial r}{\partial r_{LOS}}\right|^2 \cdot \sigma_{LOS}^2 + \left|\dfrac{\partial r}{\partial \phi}\right|^2 \cdot \sigma_\phi^2$ | 709 |
| $\dfrac{\partial r}{\partial r_{LOS}} = \cos(\phi)$ | 710 |
| $\dfrac{\partial r}{\partial \phi} = - r_{LOS} \cdot \sin(\phi)$ | 711 |

| | |
|---|---|
| Let $\gamma_t \in [0, \gamma_c]$ | 813 |
| $r_t = \dfrac{h}{\sin(\pi/2 - \gamma_t)}$ | 814 |
| $r_i = r_{LOS} - r_t$ | 815 |
| $\dfrac{n_i}{n_t} \stackrel{def}{=} \dfrac{n_{water}}{n_{air}} \quad \wedge \quad \gamma_c = \sin^{-1}\sqrt{n_t/n_i}$ | 816 |
| $\gamma_i = \arcsin\left(\dfrac{\sin(\gamma_t)}{(n_i/n_t)}\right)$ | 817 |
| $d = r_i \cdot \cos(\gamma_i)$ | 818 |
| $r = \sqrt{r_t^2 - h^2} + \sqrt{r_i^2 - d^2}$ | 819 |
| $r_s = \sqrt{r^2 + (h+d)^2}$ | 820 |
| $\phi = -\arctan\left(\dfrac{h+d}{r}\right)$ | 821 |

FIG. 8C

| | |
|---|---|
| $\widehat{\sigma^2_{LOS}} = \widehat{\sigma^2_\psi} \cdot \left(\dfrac{\Delta \cdot \cos(\beta+\psi)}{\sin(\psi)} - \dfrac{\Delta \cdot \sin(\beta+\psi)\cdot\cos(\psi)}{\sin^2(\psi)}\right)^2 + \widehat{\sigma^2_\beta} \cdot \left(\dfrac{\Delta \cdot \cos(\beta+\psi)}{\sin(\psi)}\right)^2$ | 602 |
| $\sigma^2_h \stackrel{def}{=} \sigma^2_{user}$ | 703 |
| $\sigma^2_{\gamma_t} = \sigma^2_G$ | 822 |
| $n \stackrel{def}{=} \dfrac{n_i}{n_t}$ | 823 |
| $\sigma^2_n = \left|\dfrac{\partial n}{\partial T}\right|^2 \cdot \sigma^2_T + \left|\dfrac{\partial n}{\partial B}\right|^2 \cdot \sigma^2_B$ | 824 |

FIG. 8D

| | | |
|---|---|---|
| $\sigma_d^2 = \left|\dfrac{\partial d}{\partial r_{LOS}}\right|^2 \cdot \sigma_{LOS}^2 + \left|\dfrac{\partial d}{\partial h}\right|^2 \cdot \sigma_h^2 + \left|\dfrac{\partial d}{\partial \gamma_t}\right|^2 \cdot \sigma_{\gamma_t}^2 + \left|\dfrac{\partial d}{\partial n}\right|^2 \cdot \sigma_n^2$ | | 825 |
| $\dfrac{\partial d}{\partial r_{LOS}} = \cos(\gamma_i)$ | | 826 |
| $\dfrac{\partial d}{\partial h} = -\dfrac{\cos(\gamma_i)}{\cos(\gamma_t)}$ | | 827 |
| $\dfrac{\partial d}{\partial \gamma_t} = -\dfrac{h \cdot \sin(\gamma_t) \cdot \cos(\gamma_i)}{\cos^2(\gamma_t)} - \dfrac{r_i \cdot \sin(\gamma_i)\cos(\gamma_t)}{n \cdot \sqrt{1 - \dfrac{\sin^2(\gamma_t)}{n^2}}}$ | | 828 |
| $\dfrac{\partial d}{\partial n} = \dfrac{r_i \cdot \sin(\gamma_i) \cdot \sin(\gamma_t)}{n^2 \cdot \sqrt{1 - \dfrac{\sin^2(\gamma_t)}{n^2}}}$ | | 829 |

FIG. 8E

| | | |
|---|---|---|
| $\sigma_r^2 = \left|\dfrac{\partial r}{\partial r_{LOS}}\right|^2 \cdot \sigma_{LOS}^2 + \left|\dfrac{\partial r}{\partial h}\right|^2 \cdot \sigma_h^2 + \left|\dfrac{\partial r}{\partial \gamma_t}\right|^2 \cdot \sigma_{\gamma_t}^2 + \left|\dfrac{\partial r}{\partial n}\right|^2 \cdot \sigma_n^2$ | | 830 |
| $\dfrac{\partial r}{\partial r_{LOS}} = \dfrac{\left(r_i - d \cdot \dfrac{\partial d}{\partial r_{LOS}}\right)}{\sqrt{r_i^2 - d^2}}$ | | 831 |
| $\dfrac{\partial r}{\partial h} = \dfrac{\left(\dfrac{r_t}{\sqrt{r_t^2 - h^2}} - \dfrac{r_i}{\sqrt{r_i^2 - d^2}}\right)}{\cos(\gamma_t)} - \dfrac{d}{\sqrt{r_i^2 - d^2}} \cdot \dfrac{\partial d}{\partial h} - \dfrac{h}{\sqrt{r_t^2 - h^2}}$ | | 832 |
| $\dfrac{\partial r}{\partial \gamma_t} = \left(\dfrac{r_t}{\sqrt{r_t^2 - h^2}} - \dfrac{r_i}{\sqrt{r_i^2 - d^2}}\right) \cdot \dfrac{h \cdot \sin(\gamma_t)}{\cos^2(\gamma_t)} - \dfrac{d}{\sqrt{r_i^2 - d^2}} \cdot \dfrac{\partial d}{\partial \gamma_t}$ | | 833 |
| $\dfrac{\partial r}{\partial n} = \dfrac{-d}{\sqrt{r_i^2 - d^2}} \cdot \dfrac{\partial d}{\partial n}$ | | 834 |

FIG. 8F $$\sigma_{r_s}^2 = \left|\frac{\partial r_s}{\partial r_{LOS}}\right|^2 \cdot \sigma_{LOS}^2 + \left|\frac{\partial r_s}{\partial h}\right|^2 \cdot \sigma_h^2 + \left|\frac{\partial r_s}{\partial \gamma_t}\right|^2 \cdot \sigma_{\gamma_t}^2 + \left|\frac{\partial r_s}{\partial n}\right|^2 \cdot \sigma_n^2 \quad 835$$

$$\frac{\partial r_s}{\partial r_{LOS}} = \frac{\left(r \cdot \frac{\partial r}{\partial r_{LOS}} + (d+h) \cdot \frac{\partial d}{\partial r_{LOS}}\right)}{\sqrt{r^2 + (d+h)^2}} \quad 836$$

$$\frac{\partial r_s}{\partial h} = \frac{\left(r \cdot \frac{\partial r}{\partial h} + (d+h) \cdot \left(1 + \frac{\partial d}{\partial h}\right)\right)}{\sqrt{r^2 + (d+h)^2}} \quad 837$$

$$\frac{\partial r_s}{\partial \gamma_t} = \frac{\left(r \cdot \frac{\partial r}{\partial \gamma_t} + (d+h) \cdot \frac{\partial d}{\partial \gamma_t}\right)}{\sqrt{r^2 + (d+h)^2}} \quad 838$$

$$\frac{\partial r_s}{\partial n} = \frac{\left(r \cdot \frac{\partial r}{\partial n} + (d+h) \cdot \frac{\partial d}{\partial n}\right)}{\sqrt{r^2 + (d+h)^2}} \quad 839$$

FIG. 8G $$\sigma_\phi^2 = \left|\frac{\partial \phi}{\partial r_{LOS}}\right|^2 \cdot \sigma_{LOS}^2 + \left|\frac{\partial \phi}{\partial h}\right|^2 \cdot \sigma_h^2 + \left|\frac{\partial \phi}{\partial y_t}\right|^2 \cdot \sigma_{y_t}^2 + \left|\frac{\partial \phi}{\partial n}\right|^2 \cdot \sigma_n^2 \qquad 840$$

$$\frac{\partial \phi}{\partial r_{LOS}} = \frac{\left(\frac{(d+h)}{r} \cdot \frac{\partial r}{\partial r_{LOS}} - \frac{\partial d}{\partial r_{LOS}}\right)}{r \cdot \left(1 + \frac{(d+h)^2}{r^2}\right)} \qquad 841$$

$$\frac{\partial \phi}{\partial h} = \frac{\left(\frac{(d+h)}{r} \cdot \frac{\partial r}{\partial h} - \frac{\partial d}{\partial h} - 1\right)}{r \cdot \left(1 + \frac{(d+h)^2}{r^2}\right)} \qquad 842$$

$$\frac{\partial \phi}{\partial y_t} = \frac{\left(\frac{(d+h)}{r} \cdot \frac{\partial r}{\partial y_t} - \frac{\partial d}{\partial y_t}\right)}{r \cdot \left(1 + \frac{(d+h)^2}{r^2}\right)} \qquad 843$$

$$\frac{\partial \phi}{\partial n} = \frac{\left(\frac{(d+h)}{r} \cdot \frac{\partial r}{\partial n} - \frac{\partial d}{\partial n}\right)}{r \cdot \left(1 + \frac{(d+h)^2}{r^2}\right)} \qquad 844$$

FIG. 8H

SYSTEM AND METHODS FOR OPTIMAL PRECISION POSITIONING USING MINIMUM VARIANCE SUB-SAMPLE OFFSET ESTIMATION

BACKGROUND OF THE INVENTION

The present invention relates to the precise estimation of direction and range to remote objects submersed in a liquid, such as water, or a plasma, as well as remote, atmospheric objects residing in air, by means of sampled data systems such as stereoscopic ("stereo") camera systems and time-of-flight systems. Stereoscopic camera systems can be passive as in a standard stereo-camera, or active as in a structured light camera, which radiates a visible or infrared light pattern onto a scene and uses a stereo-camera to estimate depth of field from the patterned scene. While time-of-flight systems actively transmit a narrowband, wideband, or ultra-wideband pulse in the visible, infrared, radio or acoustic spectrums and measure the travel time, or time-of-flight, at a receiver. In some time-of-flight systems it is known to use particular pulse shapes like continuous-wave, frequency modulated, maximum length sequences and other coded sequences, all of which are effectively correlated with their replica. Two-way time-of-flight is measured in monostatic systems with a collocated transmitter/receiver, and one-way time-of-flight is measured in bistatic systems with separated transmitter/receiver.

For stereo-camera systems, which process spatially sampled data, degree of precision depends on an estimate of sub-pixel registration in units of pixels, or spatial samples. For time-of-flight systems, which process temporally sampled data, degree of precision depends on an estimate of sub-sample offset, or group delay, in units of temporal samples. In the proceeding, sample can refer to a pixel in the context of a stereo-camera system, or a temporal sample in the context of a time-of-flight system.

With respect to stereo-camera systems, device miniaturization in smart-phones and robotics, for example, has created a trend of progressively smaller camera separation distances requiring the ability to resolve ever minute parallax angles. Moreover, the ability to accurately estimate far-field object distances from digital images is sure to have a wide reaching impact on both real-time and offline applications for law enforcement and criminal forensics, security and surveillance, surveying, autonomous vehicles, aerial drones and machine vision in general, but it requires accurate estimates of slim parallax angles. And notwithstanding the availability of high-resolution cameras, in order to accurately measure ever smaller parallax angles, modern stereo-camera systems must have the capability to perform sub-pixel registration, as is known in the art.

Sub-pixel registration, which estimates the pixel offset between images is also required when estimating far-field object distances, where the parallax angle narrows substantially and covers only a small number of pixels with the sub-pixel component comprising a non-negligible percentage of the offset between stereo images.

The problem of estimating the parallax angle from two stereo digital images is familiar to one trained in the art. The prior art discloses the use of peak detection on the spatial correlation between stereo images. Furthermore, the prior art discloses that more accurate peaks can be obtainable by the use of phase correlation, for which the 2-D Discrete Fourier Transform (DFT) is applied to both images, followed by the Schur (i.e. Hadamard) Product of the two transforms (one conjugated), and the result is magnitude normalized (to isolate the phase) and inverse transformed. Additionally, the prior art discloses a variant of phase correlation based on the 1-D Discrete Fourier Transform of horizontal image rows with averaging across the vertical dimension, which is substantially more computationally efficient than the 2-D approach and is the technique employed by the present invention. To address the problem of estimating the sub-pixel registration, the prior art discloses various techniques to compute an interpolated correlation peak based on an existing integer pixel offset already produced by the spatial or phase correlation approaches. Techniques disclosed in the prior art include Lagrange polynomial interpolation, linear and non-linear interpolation or regression, and polyphase interpolation, typically applied in the spatial domain to the correlation peak value, its nearest neighbors, and the associated spatial indices. Techniques such as these are heuristic in nature and make assumptions about the behavior of the phase correlation function between pixels. For example, the Lagrange polynomial interpolation technique assumes the phase correlation function is inherently polynomial, while the linear interpolation technique assumes a linear variation of the correlation function.

With respect to time-of-flight systems, similar interpolation techniques are also known to those skilled in the art. The interpolation techniques are applied to estimating relative sub-sample offset between a transmitted pulse and a received pulse that have been time aligned with integer precision. As with stereo-camera systems, such interpolation techniques used in time-of-flight systems suffer from notable shortcomings.

One shortcoming of such interpolation techniques is that they produce estimates based on a single measurement of the sub-sample offset. Thus, such techniques do not produce a consistent estimate based on an arithmetic mean of multiple measurements, wherein the estimate's error variance could decay as the number of measurements is increased, thus producing unbiased, high-precision estimates. Accordingly, such prior art interpolation techniques produce estimates that are often unpredictably biased relative to the true sub-sample offset and lack precision.

Another shortcoming of the prior art is lack of an optimal strategy for phase noise suppression. Phase noise limits the precision achievable with phase correlation approaches. Some prior art approaches to suppressing phase noise are based on truncating upper frequencies of the cross-power spectrum, from which phase correlation derives. Other approaches provide spectrum weighting of the normalized cross-power spectrum. Such approaches are heuristic and tend to distort the cross-power spectrum phase response in a non-predictable manner, which contributes to the bias in their associated sub-sample offset estimates.

A final shortcoming of prior art approaches is the lack of quantifying and reporting the estimation error variance. For example, in the case of the polyphase interpolation approach, the reliability of the sub-sample offset estimate is given as the percentage of power in the main peak of the phase correlation. While such a reliability value conveys the level of confidence in a given sub-sample offset estimate, it does not indicate the precision of that estimate in units of samples, as might be inferred from an estimation error variance. Characterization of error variance is a cornerstone of estimation theory and is essential to effective localization and decision-making.

BRIEF SUMMARY OF THE INVENTION

The goal of the present invention is to provide a system and methods capable of optimal precision direction or range determination through air or across a refractive boundary separating air from a liquid or plasma. The system and methods disclosed in the present invention improves precision in sub-sample offset estimation for a stereo camera system and time-of-flight system. A stereo-camera system processes stereoscopic digital images captured by a stereo-camera having dual left and right optical sensors, separated at a known distance, and operating in the visible or infrared spectrum. A time-of-flight system processes digital signals sampled from narrowband, wideband, or ultra-wideband pulses in the visible, infrared, radio or acoustic spectrums. While achieving this stated goal, the present invention offers remedies to the shortcomings heretofore identified with respect to the prior art in the areas of precision, phase noise suppression, and error variance reporting.

The present invention achieves improved precision in sub-sample offset estimation by employing a globally minimum variance linear phase estimation method. The minimum variance method disclosed by the present invention goes beyond conventional linear phase estimation approaches by selecting the optimal frequencies to use in the estimation process, in a manner that minimizes the affects of phase noise, while compensating for spectrum correlations between neighboring frequencies that may result from time-domain windows applied prior to DFT. The methods disclosed in the present invention are designed for execution on a central processing unit (CPU) having a memory and arithmetic logic units as is known in the art. Moreover, the disclosed methods can execute on a general purpose computer, graphics processing unit (GPU), field-programmable gate array (FPGA) or application specific integrated circuit (ASIC). In addition, the present invention tracks measurement and estimation variances as they propagate through the system in order to provide a comprehensive error variance analysis of all estimated quantities, thereby informing the user of the precision for each estimate reported, wherein precision information is reported on the same display illustrating the subject under focus, such as a viewfinder, smartphone, augmented reality (AR) display, or heads-up-display (HUD).

A first aspect of the invention employs a left and right stereoscopic camera embodiment to make an optimal precision, sub-pixel resolution estimate of the parallax angle at the subject subtended by the dual optical sensor pair in order to triangulate an estimate of the line-of-sight (LOS) range to the subject under focus. The right subject image is a reference signal and the left subject image is lagged (i.e. right shifted) relative to the right signal. The system achieves integer-pixel alignment using phase correlation. Following integer-pixel alignment, the system estimates sub-pixel registration, or offset, between reference (right) and lagged (left) signals. Reference and lagged signals are both stored as respective matrices.

A second aspect of the invention employs a time-of-flight embodiment to make an optimal precision sub-sample resolution estimate of how many temporal samples have elapsed between transmission and reception. The time-of-flight system achieves integer sample alignment by a sliding window correlator operating on a reference signal and a lagged signal. Following integer sample alignment, the system estimates sub-sample offset between reference and lagged signals. Reference and lagged signals are segmented into contiguous rows to form respective matrices.

To achieve optimal sub-sample precision with robustness to noise, the invention first makes a consistent estimate of the spectral transfer function relating the transforms of the left and right images. It is assumed at the outset that the spectral transfer function is a frequency response having a phase response which is substantially linear with respect to frequency, with a slope equaling the sub-pixel registration, or fractional sample offset between left and right subject images. Next, the spectral transfer function estimate and its associated error variance are used to derive the signal-to-noise-ratio (SNR) for each frequency, and the SNR is used to predict the corresponding phase noise power levels, or phase error variances, which are then sorted in ascending order. Then, the present invention estimates the phase response of the spectral transfer function estimate, where the frequencies included in the estimate are selected efficiently and optimally to minimize the predicted error variance of the estimated slope of a linear phase dependence. FIG. 1 illustrates the predicted minimum variance 101 achieved by the present invention for a stereo-camera system. Moreover, FIG. 2 illustrates the high degree of phase linearity over accepted optimal frequencies 200, in contrast to rejected frequencies 201. The estimated slope is taken as the sub-sample offset estimate. Additionally, the invention provides a means of calculating and reporting the precision of the sub-sample offset estimate and the line-of-sight range estimate on which it depends. A third aspect of the invention uses the line-of-sight range estimate to calculate the horizontal range and altitude of an atmospheric subject. A fourth aspect of the invention employs the line-of-sight range estimate to calculate the horizontal range, slant-range, depth, and depression angle of a subject submersed in a liquid or plasma by compensating for refraction according to Snell's Law with respect to the liquid's or plasma's temperature and pressure; in both the second and third aspects, azimuth is calculated as an offset within the field-of-view relative to a known heading. Moreover, the third and fourth aspects provide means for deriving a precision for each estimated quantity based on the error variances of the line-of-sight range estimate and relevant measurements.

With further regard to the first and second aspects of the invention, and in contrast to the prior art, the present invention discloses a consistent estimate of the true non-integer pixel offset and reports the error variance of the non-integer pixel offset estimate, indicating the precision of that estimate. A consistent estimate is defined as one whose expected value equals the random parameter being estimated, while having an error variance that tends to zero as the number of measurements approaches infinity.

Relative to the stereo-camera embodiment, the present invention is capable of achieving such an estimate by exploiting two facets of dual camera systems. First, stereo-camera systems are aligned with the lateral baseline they are mounted on, which means the phase difference affects only the horizontal dimension, relative to the dual camera system's local reference frame. This fact suggests that the M vertically stacked rows (i.e. horizontal vectors) of pixels can provide multiple measurements of the cross power spectrum between left and right images that can be averaged to produce a frequency response having a reduced-noise phase response. Second, in a stereo-camera system, the left image is right-shifted relative to the right image, creating a linear phase response whose slope magnitude corresponds to the non-integer pixel offset separating the images.

And relative to the time-of-flight embodiment, the present invention reshapes integer sample aligned reference and lagged signals, acquired by a time-of-flight system, by segmenting each into contiguous rows of respective matrices. This novel construction allows multiple measurements of the cross power spectrum between reference and lagged signals, computed over the rows, to be averaged, leading to a reduced-noise phase response. Moreover, the multiple measurements allows to estimate phase error variances for each frequency, thus enabling a minimum variance linear phase estimate.

The reduced-noise phase response produced by averaging the cross power spectrum should be substantially linear, allowing for the regression of linear phase with respect to radian frequency. The slope of the phase response is determined by dividing the real-valued covariance, between the phase angle and radian frequency, by the mean-squared radian frequency in the sample.

FIG. 3 and FIG. 3B provide an overview of the methods used by the stereo-camera and time-of-flight embodiments disclosed in the present invention.

BRIEF DESCRIPTION OF THE SEVERAL VIEWS OF THE DRAWING

FIG. 4F: Integer Pixel Processing Equations
FIG. 4G: Sub-pixel Processing Equations
FIG. 4H: SNR Estimate Equations
FIG. 4I: Phase Error Variance Estimate Equations
FIG. 4J: Sub-pixel Error Minimization Equations
FIG. 4K: Sub-pixel Estimate Equations
FIG. 4L: Sub-pixel Error Analysis Equations
FIG. 4N: Recurrence Relation Computation Structure
FIG. 5B: Parallax Angle Estimation Equations
FIG. 6A: Line-of-Sight Range Estimate Equations
FIG. 6B: Line-of-Sight Range Estimate Geometry
FIG. 7A: Estimate Equations (Atmospheric Subject)
FIG. 7B: Estimation and Measurement Error Variance Equations (Atmospheric Subject)
FIG. 7C: Altitude Estimate Error Variance Equations (Atmospheric Subject)
FIG. 8C: Estimate Equations (Submersed Subject)
FIG. 8D: Estimation and Measurement Error Variance Equations (Submersed Subject)
FIG. 8E: Depth Estimate Error Variance Equations (Submersed Subject)
FIG. 8F: Range Estimate Error Variance Equations (Submersed Subject)
FIG. 8G: Slant-Range Estimate Error Variance Equations (Submersed Subject)
FIG. 8H: Depression Angle Estimate Error Variance Equations (Submersed Subject)

DETAILED DESCRIPTION OF THE INVENTION

In the proceeding, a detailed description of the system and methods for stereo-camera embodiments is given, followed by a detailed description of time-of-flight embodiments. Stereo-camera embodiments perform six methods as indicated in the overview shown in FIG. 3. Time-of-flight embodiments perform five methods as indicated in the overview shown in FIG. 3B.

Figure 3:
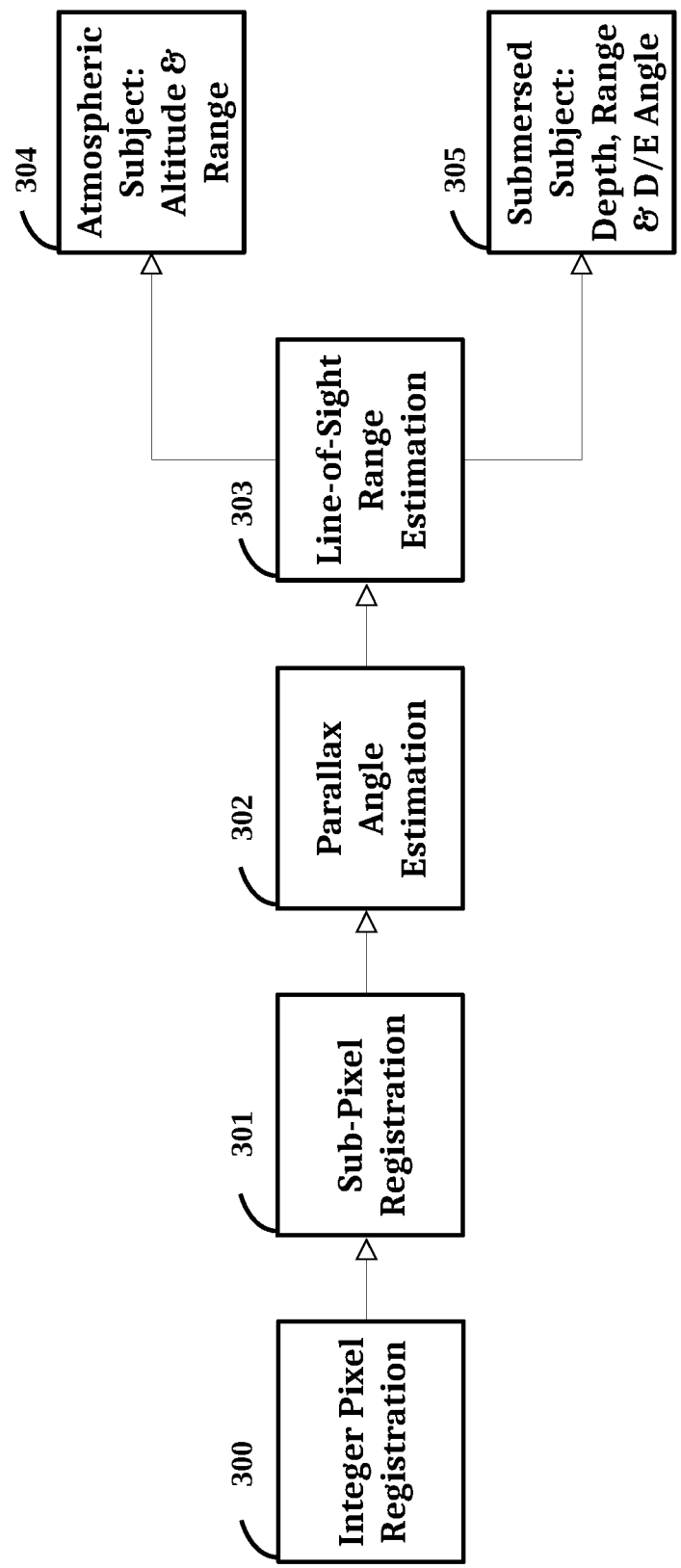
FIG. 3: Overview (Stereo-camera)
Figure 4A:
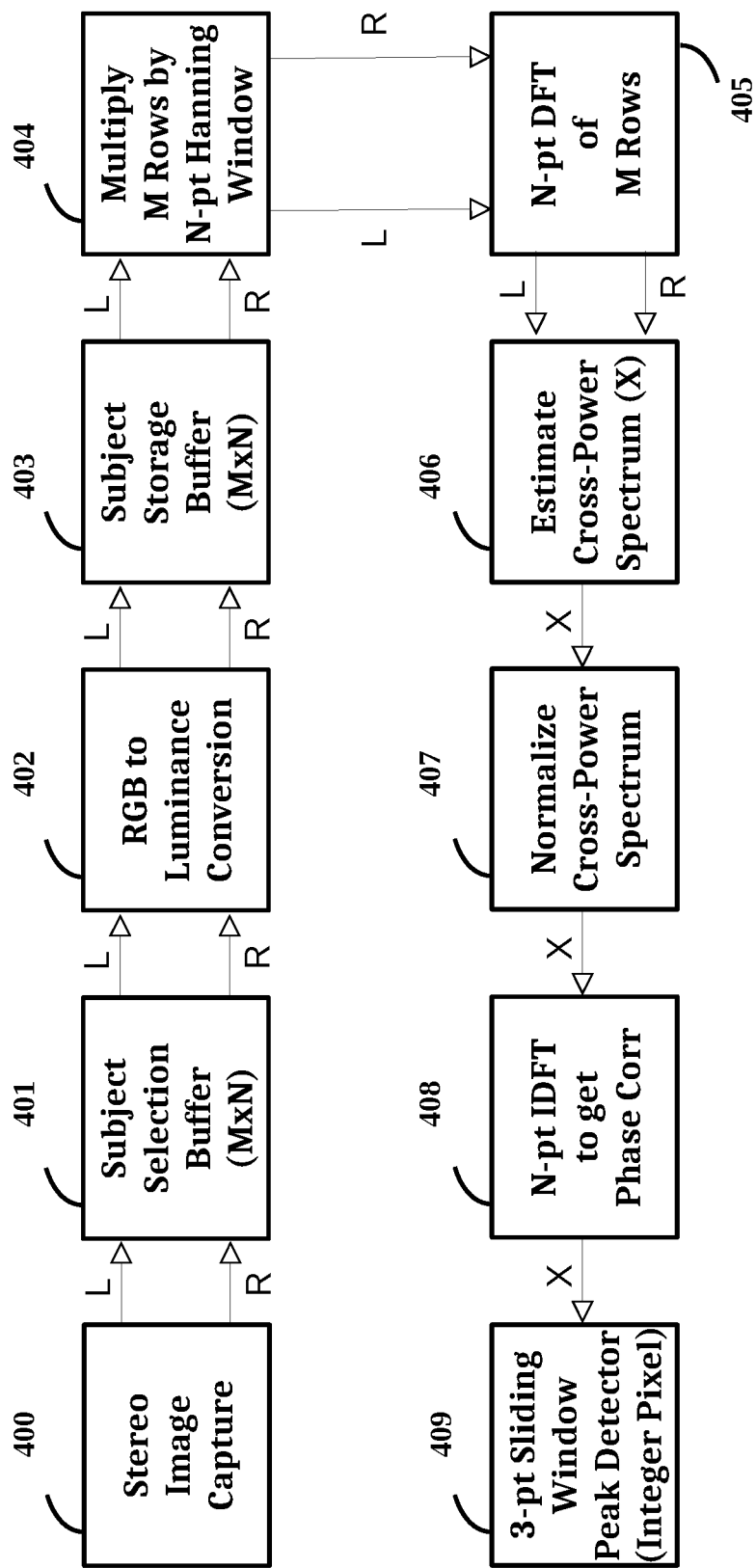
FIG. 4A: Integer Pixel Processing

The purpose of the first method shown in Overview FIG. 3, Integer Pixel Registration 300, is to determine the integer horizontal pixel offset of a subject captured in a left stereo image relative to a right stereo image. Integer Pixel Registration 300 informs method Sub-Pixel Registration 301 how to align subject pixels shared in common between left and right, and discard pixels that do not appear in both subjects, thereby reducing the effective noise level presented to Sub-Pixel Registration 301. Method Integer Pixel Registration 300 comprises ten steps as illustrated in FIG. 4A.

The first step of method Integer Pixel Registration 300 is Stereo Image Capture 400, which simultaneously captures left and right images using a stereo-camera having corresponding left and right optical sensors separated at a known distance, and operating in the visible or infrared spectrum.

The second step of method Integer Pixel Registration 300 is Subject Selection Buffer 401, which allows a user or automated agent to select from the right image, the smallest rectangular buffer that contains the subject, so that a substantial portion of the selection buffer reflects the line-of-sight range to the subject. The dimensions of the rectangle are defined to have M pixel rows and N pixel columns, comprising an M×N subject image. Similarly, the right subject selection buffer location and dimensions are then used to select the corresponding left subject.

The third step of method Integer Pixel Registration 300 is RGB to Luminance Conversion 402, which converts Red-Green-Blue color triplet values to scalar luminance values for both left and right subject selection buffers.

The fourth step of method Integer Pixel Registration 300 is Subject Storage Buffer 403, which comprises storing the M×N subject image in a storage means for later use by subsequent steps in method Integer Pixel Registration 300 as well as subsequent steps in method Sub-Pixel Registration 301.

The fifth step of method Integer Pixel Registration 300 is Multiply M Rows by N-pt Hanning Window 404. In this step, each row of both left and right subject images are multiplied by an N sample Hanning window for the purpose of reducing spectral leakage in the following step N-pt DFT of M Rows 405.

The sixth step of method Integer Pixel Registration 300 is N-pt DFT of M Rows 405, which comprises computing the one-dimensional N sample Discrete Fourier Transform (DFT) for each row of the left and right M×N subject images, wherein rows are treated as observations indexed by the lower-case letter i, as shown in FIG. 4F Equation 440. The DFT is computed at N equally spaced frequencies which are indexed by the lower-case letter k, as shown in FIG. 4F Equation 439.

The seventh step of method Integer Pixel Registration 300 is Estimate Cross-Power Spectrum (X) 406, which comprises estimating the cross-power spectrum between the left and right subject images in order to determine the relative phase-shift between left and right subject images as a function of frequency. Due to noise, the true relative phase-shift between left and right subject images cannot be determined exactly and must be estimated.

Figure 4B:
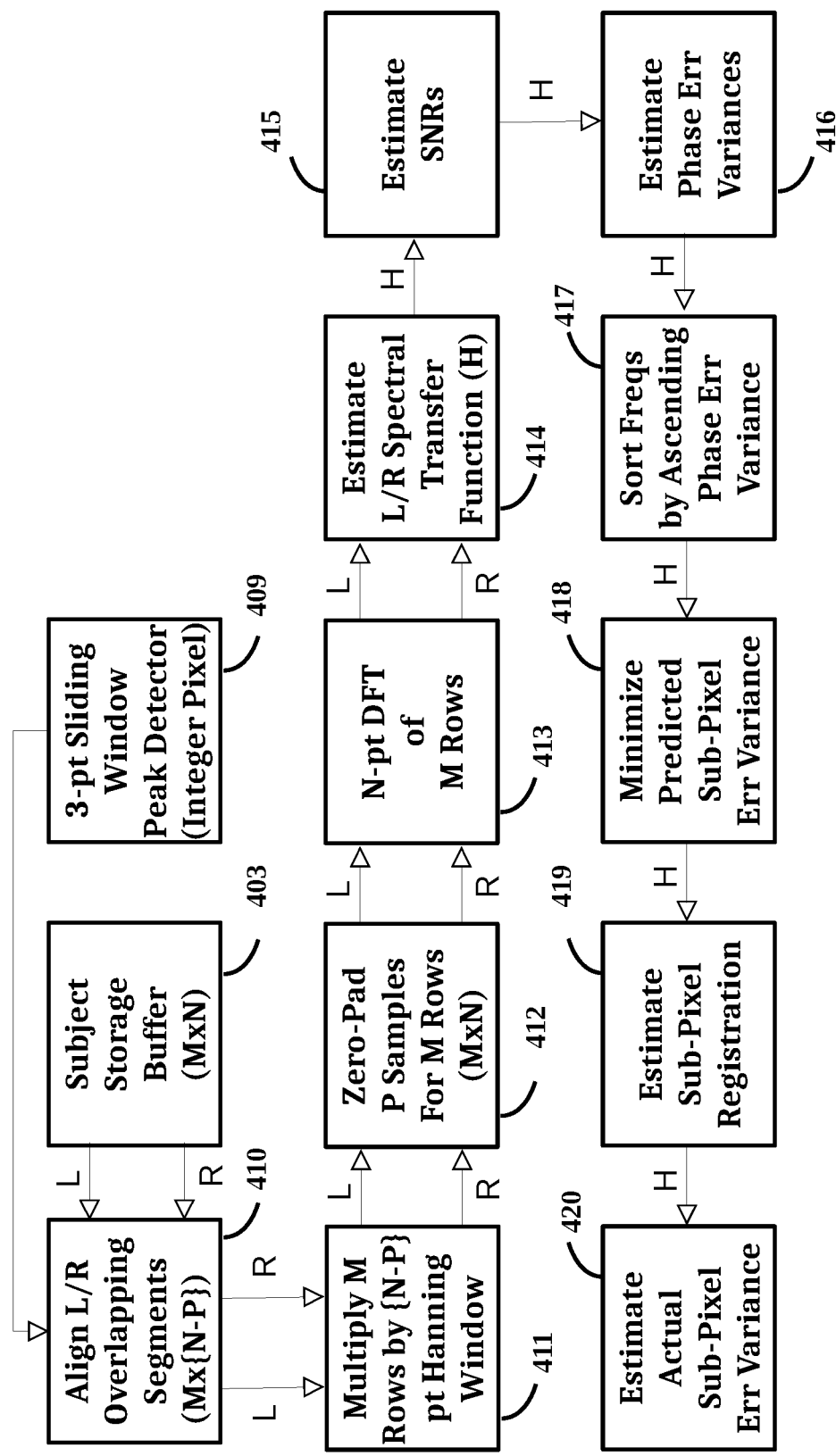
FIG. 4B: Sub-pixel Processing
Figure 4C:
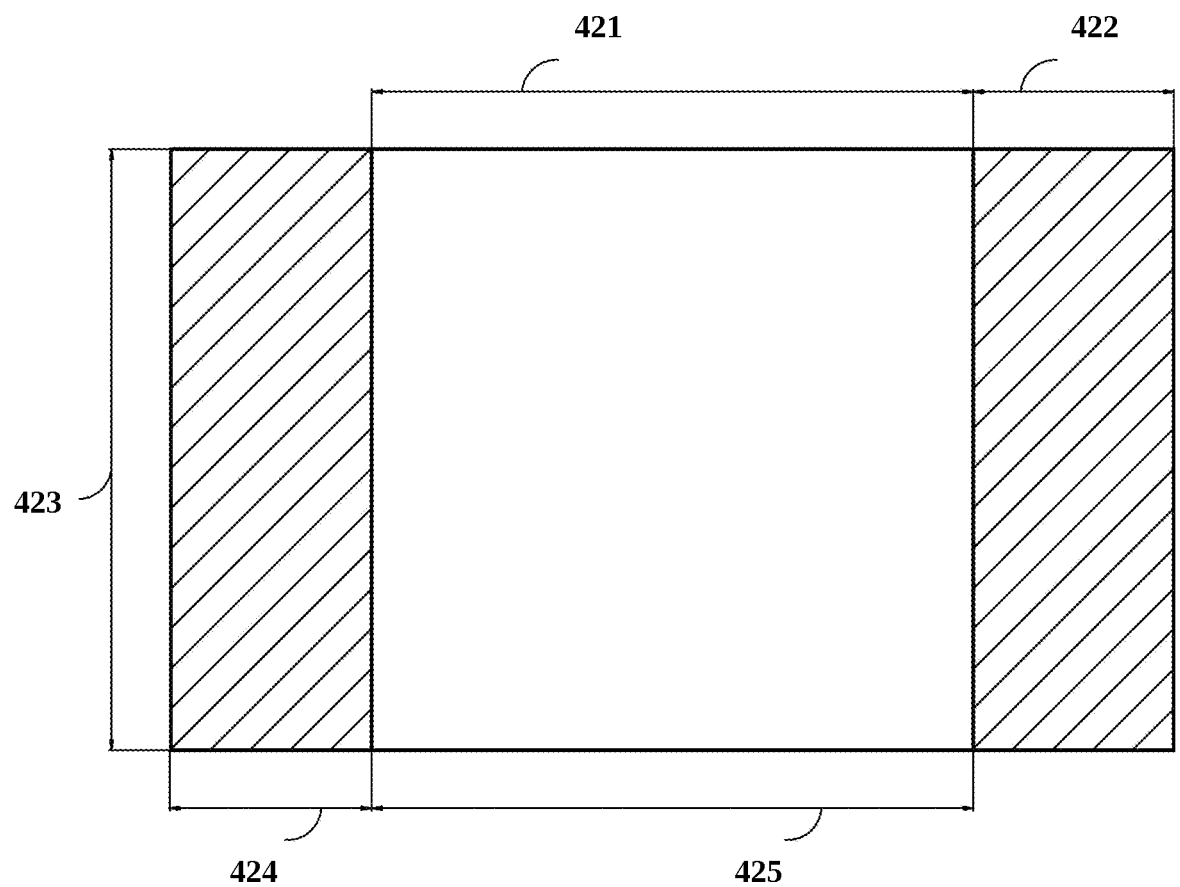
FIG. 4C: Alignment of Left/Right Overlapping Segments
Figure 4D:
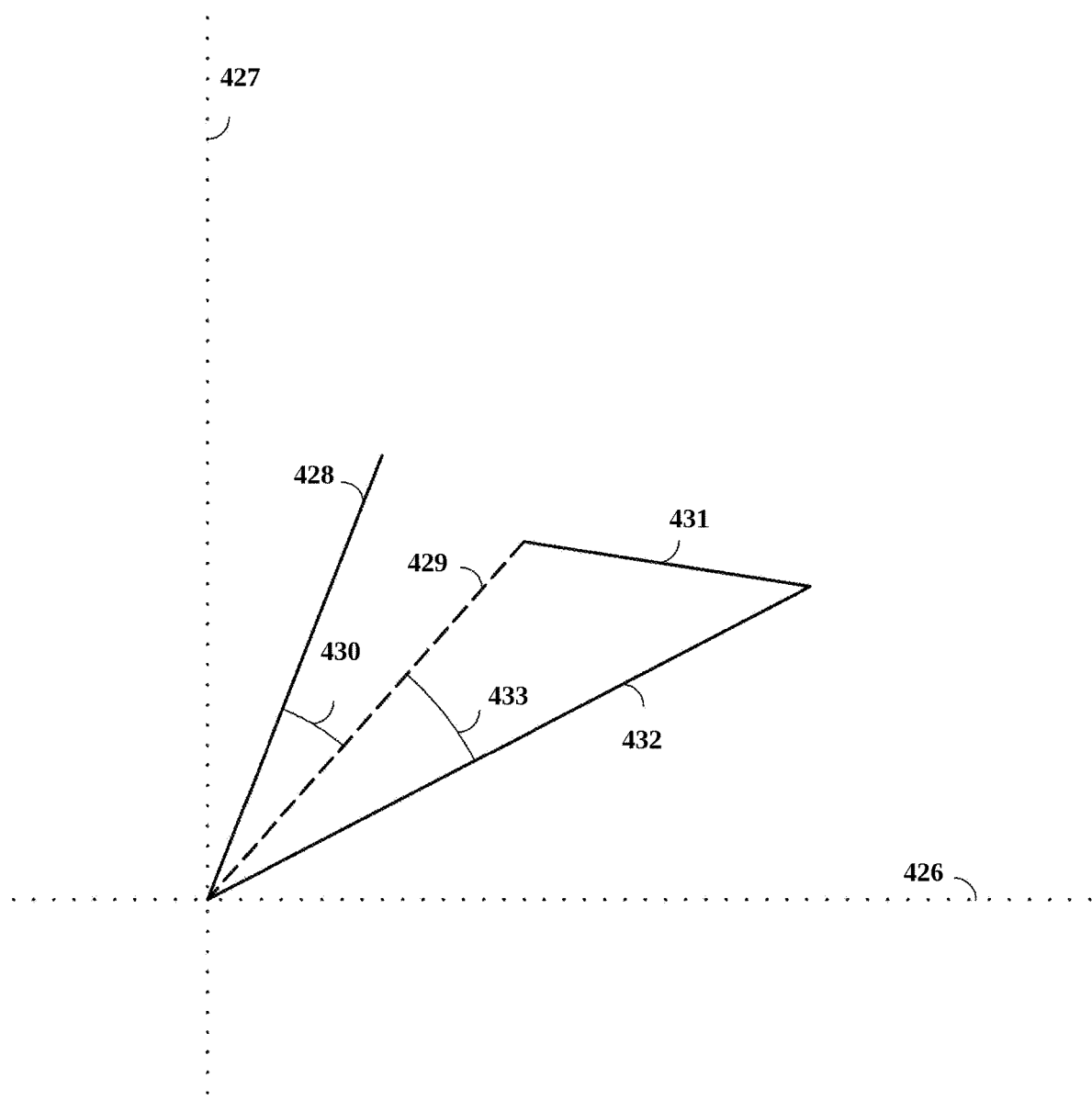
FIG. 4D: Signal Model in the Complex Plane

To illustrate, FIG. 4D shows the complex plane with real-axis is 426, imaginary-axis 427, and a number of signal vectors showing the relationship between DFT samples for left and right subject images for a typical frequency k. Vector R_i(k) 428 is the observed right subject DFT sample for the i-th of M rows. Vector 429 is the theoretical left subject DFT sample for the i-th row, which is related to R_i(k) 428 by rotation over an unknown, negative phase angle 430 (measured counter-clockwise), reflecting the fact that the left subject image is right-shifted relative to the right subject image. However, the theoretical left subject DFT sample 429 is not observable due to the addition of complex noise vector z_i(k) 431. In the presence of complex noise vector z_i(k) 431, L_i(k) 432 is observed instead. FIG. 4F Equation 441 shows that L_i(k) 432 equals the sum of complex noise vector z_i(k) 431 and R_i(k) 428 phase-shifted by true phase angle 430, which is linearly proportional to the pixel offset P, between left and right subject images, and wherein it is assumed that P is a natural number defined on the interval [0, N) for the purposes of method Integer Pixel Registration 300, as shown in FIG. 4F Equation 444. The result is a phase error 433 between the observed phase-shift and the unknown true phase-shift 430.

It is assumed that R_i(k) 428 and z_i(k) 431 are statistically independent as shown in FIG. 4F Equation 442. Furthermore, it is assumed that z_i(k) 431 from different rows are independent and identically distributed according to a complex normal distribution as shown in FIG. 4F Equation 443, wherein the complex mean is zero and the variance, sigma squared subscript z, is split evenly between real and imaginary components. Under the stated statistical assumptions, the present invention seeks to estimate the cross-power spectrum between L_i(k) and R_i(k).

The cross-power spectrum X(k) is defined as the expected value of the product L_i(k) times the complex conjugate of R_i(k), as shown in FIG. 4F Equation 445, where complex conjugation is denoted by asterisk. Multiplying FIG. 4F Equation 441 by the complex conjugate of R_i(k) amounts to the squared magnitude of R_i(k) times the phase-shift plus complex noise. By approximating the expectation as the sample mean taken over M rows, as indicated by sigma hat subscript LR in FIG. 4F Equations 446 and 447, the present invention can produce a consistent estimate of the cross-power spectrum with an error variance that decays inversely as the number of row observations M increases. It should be noted that the resulting cross-power spectrum estimate represents a reduction from M dimensions to one dimension.

Figure 4E:
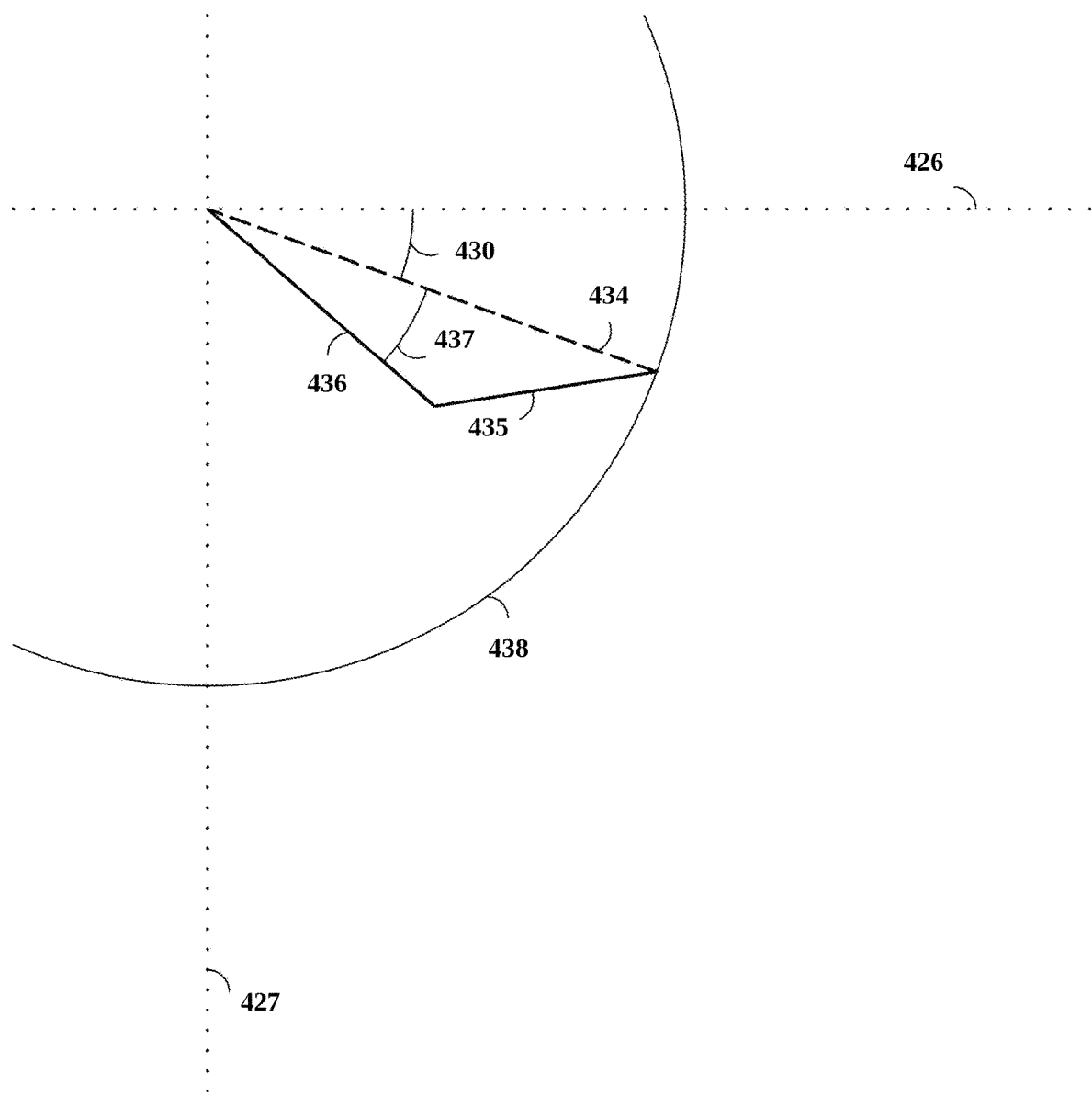
FIG. 4E: Spectral Transfer Function Error Analysis in the Complex Plane
Figure 4M:
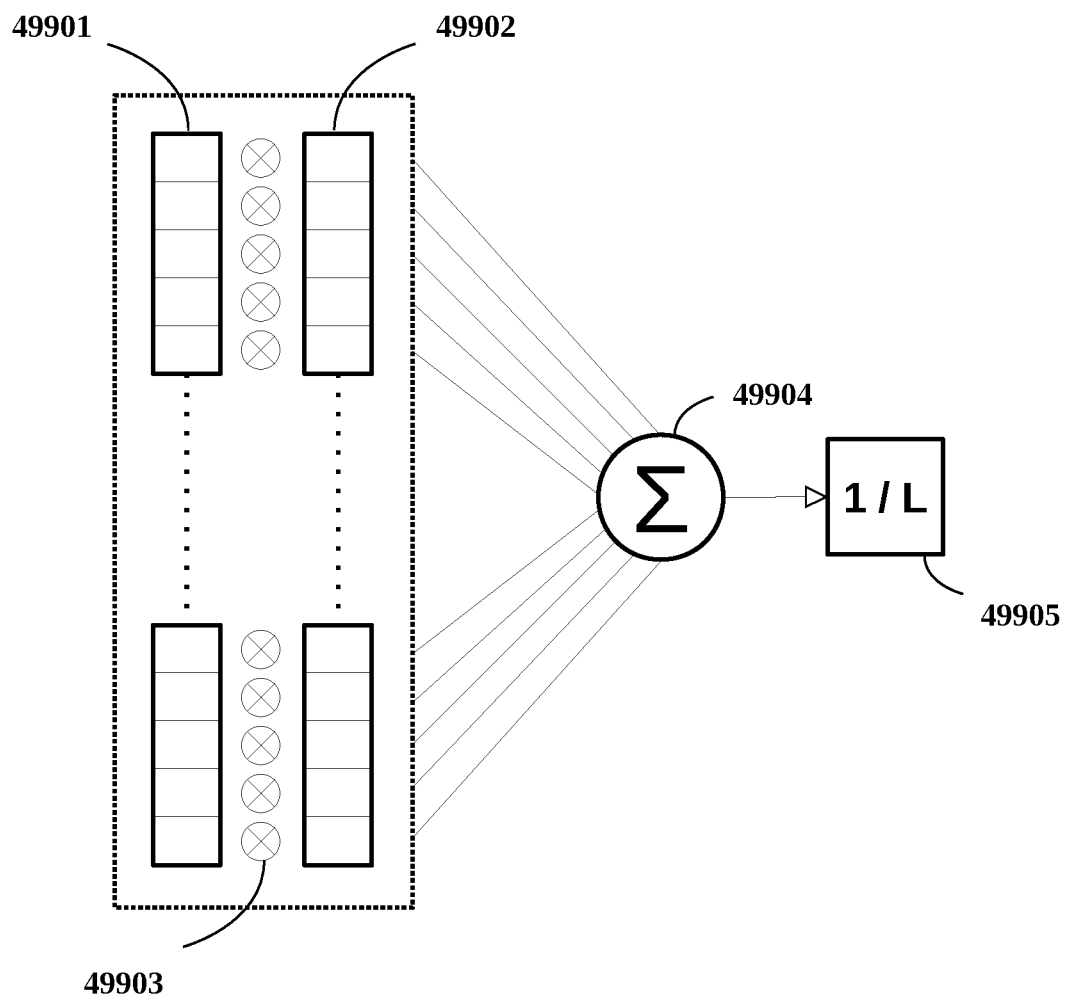
FIG. 4M: Cross-Correlator Computation Structure

To facilitate sample mean estimation of the expectation of the product of a first variable, such as L_i(k), and the complex-conjugate of a second variable, such as R_i(k), the present invention discloses a first computation structure shown in FIG. 4M. Each variable is assumed to have an observation sequence of length L, which are ordered such that opposing observations of first 49901 and second 49902 variables are in direct correspondence with respect to a given temporal, frequency or spatial index, such as the row index i. This first computation structure can also be used to calculate mean square value, wherein the first and second variable are duplicate copies for all observations, and variance, with the additional assumption of zero-mean variables. Also, the first computation structure can also operate on real-valued variables, wherein complex-conjugation of the second variable does not apply. Furthermore, multiply 49903 and accumulate 49904 operations can execute in parallel for limited segments of the input data. The final element of the first computation structure performs sample mean normalization by the observation length (L) of the observation sequences. As such, the present invention employs the first computation structure to implement 4F Equation 447, wherein the observation length (L) is equal to M, the number of horizontal rows in the left and right subject images.

The eighth and ninth steps of method Integer Pixel Registration 300 are Normalize Cross-Power Spectrum 407, followed by N-pt IDFT to get Phase Corr, comprising dividing the cross-power spectrum estimate by its magnitude across all frequencies k to produce an all-pass response that approximates the phase-shift factor, and then taking the one-dimensional N sample Inverse Discrete Fourier Transform (IDFT) to produce a spatially shifted phase correlation sequence, as shown in FIG. 4F Equation 448.

The tenth step of method Integer Pixel Registration 300 is 3-pt Sliding Window Peak Detector (Integer Pixel) 409, comprising the search for the pixel offset that yields the peak sum of any three consecutive samples having adjacent circular (modulo N) indices, as shown in FIG. 4F Equation 449. The resulting pixel offset reflects the group delay of the normalized cross-power spectrum and is taken as the integer pixel registration relating the left and right subject images, hereafter denoted P subscript int, as indicated in FIG. 4F Equation 449.

The purpose of the second method shown in Overview FIG. 3, Sub-Pixel Registration 301, is to estimate the sub-pixel registration utilizing the integer pixel registration estimated in method 300, by step 3-pt Sliding Window Peak Detector (Integer Pixel) 409, along with the left and right subject images stored by step Subject Storage Buffer 403. Method Sub-Pixel Registration 301 comprises eleven steps.

The first step of method Sub-Pixel Registration 301, as shown in FIG. 4B, is Align L/R Overlapping Segments (Mx{N−P}) 410. The purpose of this first step is to discard subject image samples that are not shared, and do not correlate, between left and right images due to the integer pixel offset (P) separating them, and which contribute to noise that lowers the precision of the sub-pixel registration estimate.

The first step 410 begins by receiving the M×N left and right subject images from step 403 and the integer pixel registration from step 409. FIG. 4C shows the procedure of aligning left and right subject images. All M rows 423 are retained for both left and right subject images. The column extent for the right subject image consists of the number of columns ({N−P}) 421 that overlap with the left subject image plus the number (P) of non-overlapping columns 422. Similarly, the column extent for the left subject image consists of the number ({N−P}) of columns 425 that overlap with the right subject image plus the number (P) of non-overlapping columns 424.

Note that the overlapping portion of the left subject image is right-shifted P pixels relative to the left edge of the left subject image, while the overlapping portion of the right subject image is aligned with the left edge of the right subject image.

The first step 410 of method Sub-Pixel Registration 301 is completed by discarding P non-overlapping left and right pixel columns, 424 and 422 respectively, and retaining {N−P} left and right overlapping pixel columns, 425 and 421 respectively.

The second step of method Sub-Pixel Registration 301 is Multiply M Rows by {N−P} pt Hanning Window 411. In this step, each row of both left and right subject images are multiplied by a {N−P} sample Hanning window for the purpose of reducing spectral leakage in the forthcoming DFT.

The third step of method Sub-Pixel Registration 301 is Zero-Pad P Samples for M Rows (M×N) 412. In this step, P pixel columns to the right of each subject image are padded with zeros to restore the full count of N columns in left and right subject images.

The fourth step of method Sub-Pixel Registration 301 is N-pt DFT of M Rows 413, which comprises computing the one-dimensional N sample Discrete Fourier Transform (DFT) for each row of the left and right M×N subject images, wherein rows are treated as observations indexed by the lower-case letter i, as shown in FIG. 4G Equation 440. The DFT is computed at N equally spaced frequencies which are indexed by the lower-case letter k. However, because left and right subject images are real-valued, only non-negative frequency DFT samples are used in subsequent processing since negative-frequency DFT samples are redundantly conjugate symmetric, with the further exclusion of zero and half the sampling frequency, whose DFT samples are always real-valued and devoid of any phase information. The number of frequencies whose DFT samples are retained for subsequent processing is N/2−1, as shown in FIG. 4G Equation 450.

The fifth step of method Sub-Pixel Registration 301 is Estimate L/R Spectral Transfer Function (H) 414, which comprises estimating the spectral transfer function relating the left and right subject images in order to determine the relative phase-shift between left and right subject images as a function of frequency. Due to noise, the true sub-pixel relative phase-shift between left and right subject images cannot be determined exactly and must be estimated. According to the fifth step, the present invention makes an estimate of the spectral transfer function.

To illustrate the basic elements defining the spectral transfer function, FIG. 4D shows the complex plane with real-axis is 426, imaginary-axis 427, and a number of signal vectors that show the relationship between DFT samples for left and right subject images for a typical frequency k. Vector R_i(k) 428 is the observed right subject DFT sample for the i-th of M rows. Vector 429 is the theoretical left subject DFT sample for the i-th row, which is related to R_i(k) 428 by rotation over an unknown, negative phase angle 430 (measured counter-clockwise), reflecting the fact that the left subject image is right-shifted relative to the right subject image. However, the theoretical left subject DFT sample 429 is not observable due to the addition of complex noise vector z_i(k) 431. In the presence of complex noise vector z_i(k) 431, L_i(k) 432 is observed instead. FIG. 4G Equation 441 shows that L_i(k) 432 equals the sum of complex noise vector z_i(k) 431 and R_i(k) 428 phase-shifted by true phase angle 430, which is linearly proportional to the pixel offset P, between left and right subject images, and wherein it is assumed that P is a real number defined on the interval (−1, 1) for the purposes of method Sub-Pixel Registration 301, as shown in FIG. 4G Equation 451. The result is a phase error 433 between the observed phase-shift and the unknown true phase-shift 430.

It is assumed that R_i(k) 428 and z_i(k) 431 are statistically independent as shown in FIG. 4G Equation 442. Furthermore, it is assumed that z_i(k) 431 from different rows are independent and identically distributed according to a complex normal distribution as shown in FIG. 4G Equation 443, wherein the complex mean is zero and the variance, sigma squared subscript z, is split evenly between real and imaginary components. Under the stated statistical assumptions, the present invention seeks to estimate the spectral transfer function between left and right subject images as the slope of the estimate of L_i(k) with respect to R_i(k).

The true spectral transfer function takes the form of a unity-magnitude complex number whose phase angle is proportional to P, the sub-pixel registration offset, as shown in FIG. 4G Equation 452. To illustrate the problem of estimating the spectral transfer function, FIG. 4E shows the complex plane with real-axis is 426, imaginary-axis 427, and the relationship between the true spectral transfer function and its estimate for a typical frequency k in the i-th of M rows. The spectral transfer function is the true, unknown unity magnitude phase-shift vector 434 that multiplies R_i(k) in order to produce L_i(k) in the absence of noise. The true associated phase-shift angle 430 is unknown, but drawn as a negative angle (measured counter-clockwise) to reflect that the left subject image is right-shifted relative to the right subject image. Arc 438 is the unit circle that circumscribes the true phase-shift vector 434. Due to the addition of complex noise vector 435, the observed phase-shift vector 436 has a phase-shift angle error 437. By modeling the spectral transfer function as the slope of the estimate of L_i(k) with respect to R_i(k), the present invention seeks to estimate the phase-shift angle 430 as well as the error variance of that estimate given the statistics of phase-shift angle error 437, the later of which is derived from the signal-to-noise ratio of the spectral transfer function estimate.

To complete the fifth step of method Sub-Pixel Registration 301, Estimate L/R Spectral Transfer Function (H) 414, the slope of the L_i(k) estimate with respect to R_i(k) is obtained by first noting that multiplying FIG. 4G Equation 441 by the complex conjugate of R_i(k), or R_i*(k), and taking the expectation of both sides yields FIG. 4G Equation 453. Then, solving for spectral transfer function H(k) produces the cross-power spectrum E[L_i(k)·R_i*(k)] divided by the variance E[R_i(k)·R_i*(k)], where the dividend and divisor expectations have consistent estimates in their sample means as shown in FIG. 4G Equations 454, 447, and 455. The first computation structure disclosed in the present invention implements FIG. 4G Equations 447 and 455, wherein the observation length (L) is equal to M, the number of horizontal rows in the left and right subject images.

The sixth step of method Sub-Pixel Registration is Estimate SNRs 415. As mentioned above, the signal-to-noise-ratio (SNR) is used to derive the error variance of the phase-shift angle estimate. FIG. 4H Equation 456 defines for the i-th of M rows, the estimate L_i(k) hat as the product R_i(k) times the spectral transfer function estimate H(k) hat. FIG. 4H Equation 457 defines for the i-th of M rows, the complex error, z_i(k) hat, between the observed and estimated left subject DFT samples, L_i(k) and L_i(k) hat respectively. FIG. 4H Equation 458 defines the error variance, sigma squared subscript z hat, of z_i(k), and is implemented by the first computation structure disclosed in the present invention, wherein the observation length (L) is equal to M. FIG. 4H Equation 459 estimates the H(k) hat error variance by summing over each of M random inputs to H(k) hat, the product of the error variance of that input times a scale factor equaling the magnitude squared of the partial derivative of H(k) hat with respect to that input. In light of FIG. 4G Equation 441, the M random inputs are simply z_i(k) with error variance sigma squared subscript z hat, and the partial derivative with respect to z_i(k) is equivalent to the partial derivative with respect to L_i(k) using the chain rule, yielding FIG. 4H Equation 460. FIG. 4H Equation 460 demonstrates that the error variance of H(k) hat decays inversely as the number of row observations M increases, making H(k) hat a consistent estimate of the spectral transfer function. Finally, the SNR is the magnitude squared of the estimate H(k) hat divided by the H(k) hat error variance, as shown in FIG. 4H Equation 461.

The seventh step of method Sub-Pixel Registration 301 is Estimate Phase Err Variances 416. Recall from FIG. 4E that H(k) hat will suffer phase angle error 437 due to the presence of complex noise vector 435. The purpose of the seventh step is to estimate the variance of phase angle error 437 using SNR calculated in the sixth step.

Given the estimate H(k) hat and the error variance estimated in step six, the true spectral transfer function H(k) follows a complex normal distribution, in rectangular coordinates (x, y), with complex mean H(k) hat and bi-variate variances equal to half the error variance of H(k) hat, as shown in FIG. 4I Equations 462, 463, and 464. The marginal density of the phase error, theta, of H(k) with respect to H(k) hat can be found by making a change of variables to polar coordinates (radius, theta) and integrating over radius from 0 to infinity, yielding FIG. 4I Equation 465, wherein capital phi denotes the Gauss Error function.

Under simplifying assumptions of high SNR, and small phase error theta, FIG. 4I Equation 465 approaches a normal distribution as shown in FIG. 4I Equation 472. Furthermore, under these assumptions, and according to definitions FIG. 4I Equation 462 and 463, the phase error variance, sigma squared subscript theta hat, for a frequency k can be estimated as one over twice SNR for that frequency, as shown in FIG. 4I Equation 473.

The eighth and ninth steps of method Sub-Pixel Registration 301 select the optimal frequencies to use when estimating the sub-pixel registration as the slope of the spectral transfer function phase response. As shown above, there is an inverse relationship between SNR and phase error variance. So, frequencies with the lowest spectral transfer function SNR should be omitted from the sub-pixel registration estimation, since their respective phase estimates have unreliably high error variances.

However, if too many frequencies are omitted, then the estimate will lack sufficient data to effectively cancel estimation noise. So, there is clearly an optimal set of frequencies that minimizes the error variance of the sub-pixel registration estimate.

To select the optimal set of frequencies, the present invention first sorts the frequencies by ascending phase error variance, and then from all Q length sets of sorted frequencies spanning the lowest error variance up to the Q-th lowest error variance, selects the Q that minimizes the predicted sub-pixel registration error variance. Note that the Q length sets will in general not have contiguous frequencies.

The eighth step of method Sub-Pixel Registration 301 is Sort Freqs by Ascending Phase Err Variance 417. The purpose of the eighth step is to sort frequency indices (k) such that corresponding phase error variances, defined by FIG. 4I Equation 473, increase as a reference index (q) is incremented, and a mapping function (s) from q to k is provided. The sorting and index mapping functions are defined in FIG. 4J Equation 477, wherein the frequency (k) with the highest phase error variance is mapped to q=N/2−1, the total number of frequencies.

The ninth step of method Sub-Pixel Registration 301 is Minimize Predicted Sub-Pixel Err Variance 418. The purpose of the ninth step is to select the optimal set of frequencies k that minimize the predicted sub-pixel registration error variance.

Recall that the spectral transfer function H(k) takes the form of a unity-magnitude complex number whose phase angle is proportional to P, the sub-pixel registration offset, as shown in FIG. 4J Equation 452. Then, the observed phase angle theta(k) is defined by FIG. 4J Equation 474, wherein it is assumed that the epsilon(k) are independent and identically distributed normal random variables that are statistically independent from omega(k), the radian frequency, as shown in FIG. 4J Equations 475 and 476.

The sub-pixel registration estimate (P hat) is given by FIG. 4J Equation 479, 480, and 481 and determines how the associated error variance is calculated. FIG. 4J Equation 482 estimates the predicted sub-pixel registration error variance, or sigma squared subscript P tilde, by summing over each of Q inputs to P hat, the product of the error variance of that input times a scale factor equaling the magnitude squared of the partial derivative of P hat with respect to that input, which is given by FIG. 4J Equation 483. Note that the predicted sub-pixel registration error variance is a function of Q and can therefore be minimized with respect to Q.

Because predicted sub-pixel registration error variance of consecutive values of Q share common elements in their numerator and denominator, it is possible to construct a recurrence relation for efficient computation of the error variance, as shown in FIG. 4J Equations 484, 485, and 486. The recurrence relation is the ratio of partial sum A(Q) divided by the square of partial sum B(Q). The present invention discloses a second computation structure, shown in FIG. 4N, that implements this recurrence relation. The second computation structure comprises a first computation unit, wherein partial sum A(Q−1) 49908, provided by delay element 49907, and its increment, provided by 49906, are added together by summing element 49909 to produce partial sum A(Q). Similarly, the second computation structure comprises a second computation unit, wherein partial sum B(Q−1) 49912, provided by delay element 49911, and its increment, provided by 49910, are added together by summing element 49913 to produce partial sum B(Q).

The ninth step of method Sub-Pixel Registration 301 is completed by evaluating the recurrence relation for Q between 1 and N/2−1 and determining the optimal value Q subscript opt that minimizes the predicted sub-pixel registration error variance, as shown in FIG. 4J Equation 487.

Figure 1:
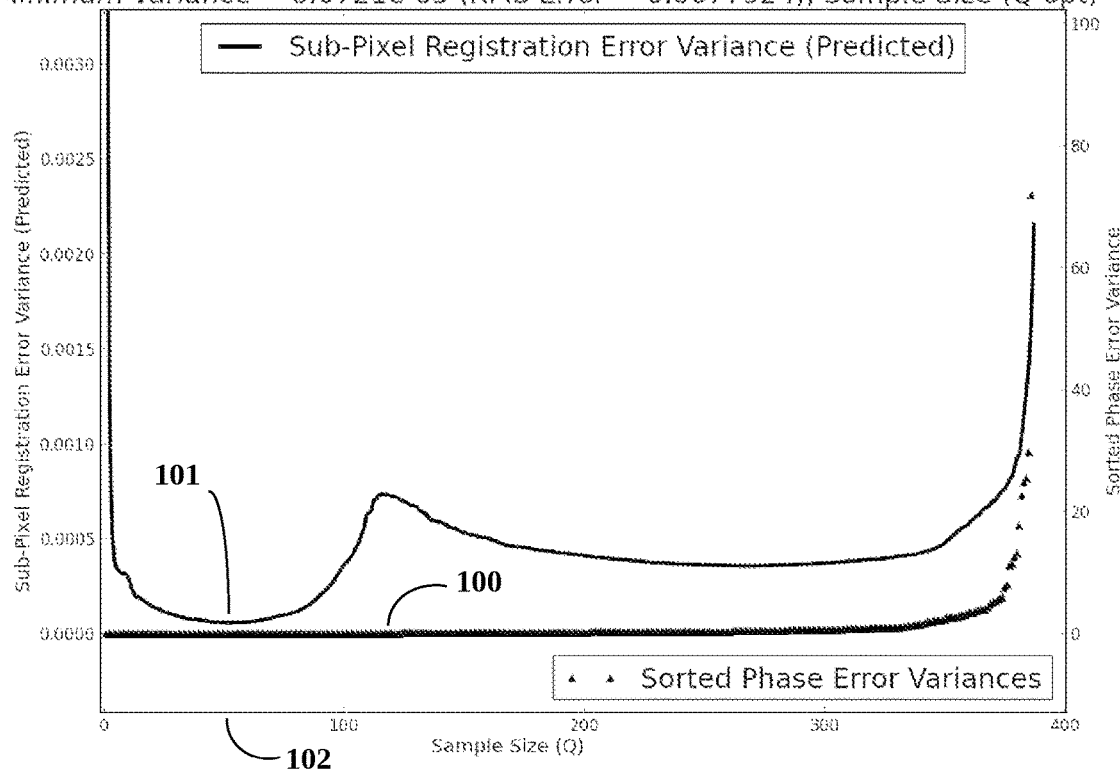
FIG. 1: Predicted Error Variance of Sub-pixel Registration Estimate

FIG. 1. shows the sorted phase error variance estimates 100 plotted on the right axis as a function of sample size Q. FIG. 1 also shows the predicted sub-pixel registration error variance plotted on the left axis as a function of sample size Q. The predicted minimum error variance 101 is achieved at optimal sample size Q opt 102. For the example shown, the predicted minimum error variance 101 is roughly 6E−5, the predicted root-mean-square error is roughly 0.008 pixels, and Q opt is 52. Note that where a predicted error variance at sample size Q is an outlier with respect to the other Q−1 variances in the sample, the Q-th and higher error variances are rejected, which has the effect of moderating the spread between small and large phase error variances, thus lowering the kurtosis of the sample, and preventing heavy-tailed phase errors.

With regard to complexity, letting n represent the N/2−1 frequencies under consideration, sorting requires O(n log n) iterations, while the recurrence relation requires O(n) iterations, making the present invention an efficient way to select the frequencies that achieve the minimum predicted sub-pixel registration error variance. By comparison, to exhaustively search for the lowest predicted sub-pixel registration error variance over every possible sample of Q frequencies, for all possible sample sizes Q, has complexity exceeding n!/Q!/(n−Q)! iterations, wherein the worst case is Q=n/2.

The tenth step of method Sub-Pixel Registration 301 is Estimate Sub-Pixel Registration 419. The purpose of the tenth step is to produce the sub-pixel registration estimate. First, the phase angles of the spectral transfer function estimate are calculated at each of the Q opt frequencies s subscript q, as shown in FIG. 4K Equation 478. Note that while the arc-tangent function is expensive computationally, it is only executed on Q opt samples. Next, the phase angles, theta of s subscript q, are used to estimate the sub-pixel registration estimate (P hat), as shown in FIG. 4K Equations 479, 488, and 489. The first computation structure disclosed in the present invention implements FIG. 4K Equation 488, with first input variable being the real-valued phase angle and the second input variable being the corresponding real-valued radian frequency with an observation length (L) equal to Q opt. Similarly, the first computation structure disclosed in the present invention implements FIG. 4K Equation 489, the mean square radian frequency, with first and second input variables being the real-valued radian frequency with an observation length (L) equal to Q opt.

The eleventh step of method Sub-Pixel Registration 301 is Estimate Actual Sub-Pixel Err Variance 420. The purpose of the eleventh step is to estimate the error variance of the sub-pixel registration estimate. Using the sub-pixel registration estimate, P hat, the linear phase estimate, theta hat, is estimated as shown in FIG. 4L Equation 490. Next, the phase estimation error, epsilon hat of s subscript q, is found by subtracting the phase estimates from the observed phases, as shown in FIG. 4L Equation 491. Then, the error variance of the phase estimates is simply the sample variance of the phase errors, as shown in FIG. 4L Equation 492; this sample variance is computed by the first computation structure disclosed in the present invention, wherein the first and second input variables are the real-valued phase errors with an observation length (L) equal to Q opt.

Finally, FIG. 4L Equation 493 estimates the actual sub-pixel registration error variance, or sigma hat squared subscript P, by summing over each of Q opt inputs to P hat, the product of the phase error variance times the magnitude squared of a scale factor equaling the partial derivative of P hat with respect to the phase error. Note that in light of FIG. 4J Equation 474, the partial derivative of P hat with respect to the phase error (epsilon) is equivalent to the partial derivative with respect to the phase (theta), using the chain rule. Substituting FIG. 4K Equations 479, 488, and 489 into FIG. 4L Equation 493 yields FIG. 4L Equation 494.

For subsequent methods, the sub-pixel registration estimate P hat will be referred to as P subscript sub, as shown in FIG. 4L Equation 495.

Figure 2:
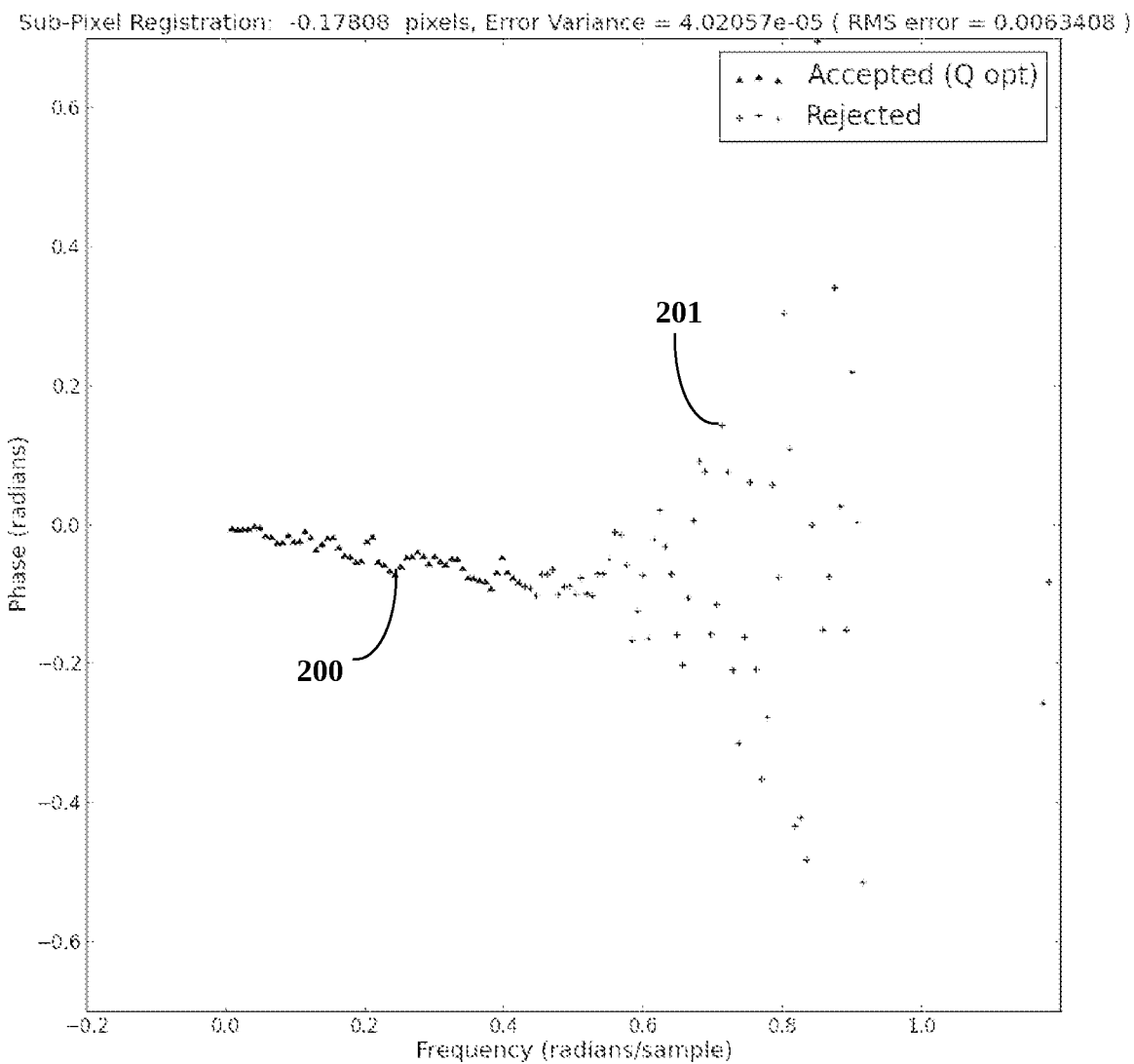
FIG. 2: Phase Response of Spectral Transfer Function

FIG. 2 illustrates the result of employing the present invention to estimate the sub-pixel registration by plotting the spectral transfer function phase as a function of radian frequency. The Q opt frequencies 200 accepted for sub-pixel registration estimation are shown as triangles, while the rejected frequencies 201 are shown as plus symbols. It is clear that the present invention is capable of isolating the phase samples 200 with low error variance from phase samples 201 with high error variance such that the minimum sub-pixel registration error variance is achieved. Note that accepted frequencies show a strong linear phase relationship with a slope less than unity, indicating the sub-pixel registration. For the example shown, the actual error variance is roughly 4E-5, while the actual root-mean-square error is roughly 0.006 pixels, showing a comparable order of magnitude to the predicted quantities shown in FIG. 1.

Sub-pixel registration precision is driven by the error variance, which improves with increases in subject image dimensions M and N as well as SNR. Recall that the predicted phase error variances given by FIG. 4I Equation 473 are proportional to the estimated spectral transfer function error variances given by FIG. 4H Equation 460, which decay inversely as the number of rows M increases. Moreover, it is assumed that predicted phase error variances 473, are positively correlated with the actual phase error variances given by FIG. 4L Equation 492. Hence, the sub-pixel registration error variance, given by FIG. 4L Equation 494, decays inversely as the number of rows M increases. Similarly, predicted phase error variance 473, and hence sub-pixel registration error variance, decays inversely as SNR increases, as shown in FIG. 4I Equation 473. Furthermore, FIG. 4L Equation 494 shows that the sub-pixel registration error variance decays inversely as Q opt increases. Q opt can be increased by increasing the number of columns N, which increases the frequency resolution and, hence, the number of frequencies with a low predicted phase error variance.

Figure 5A:
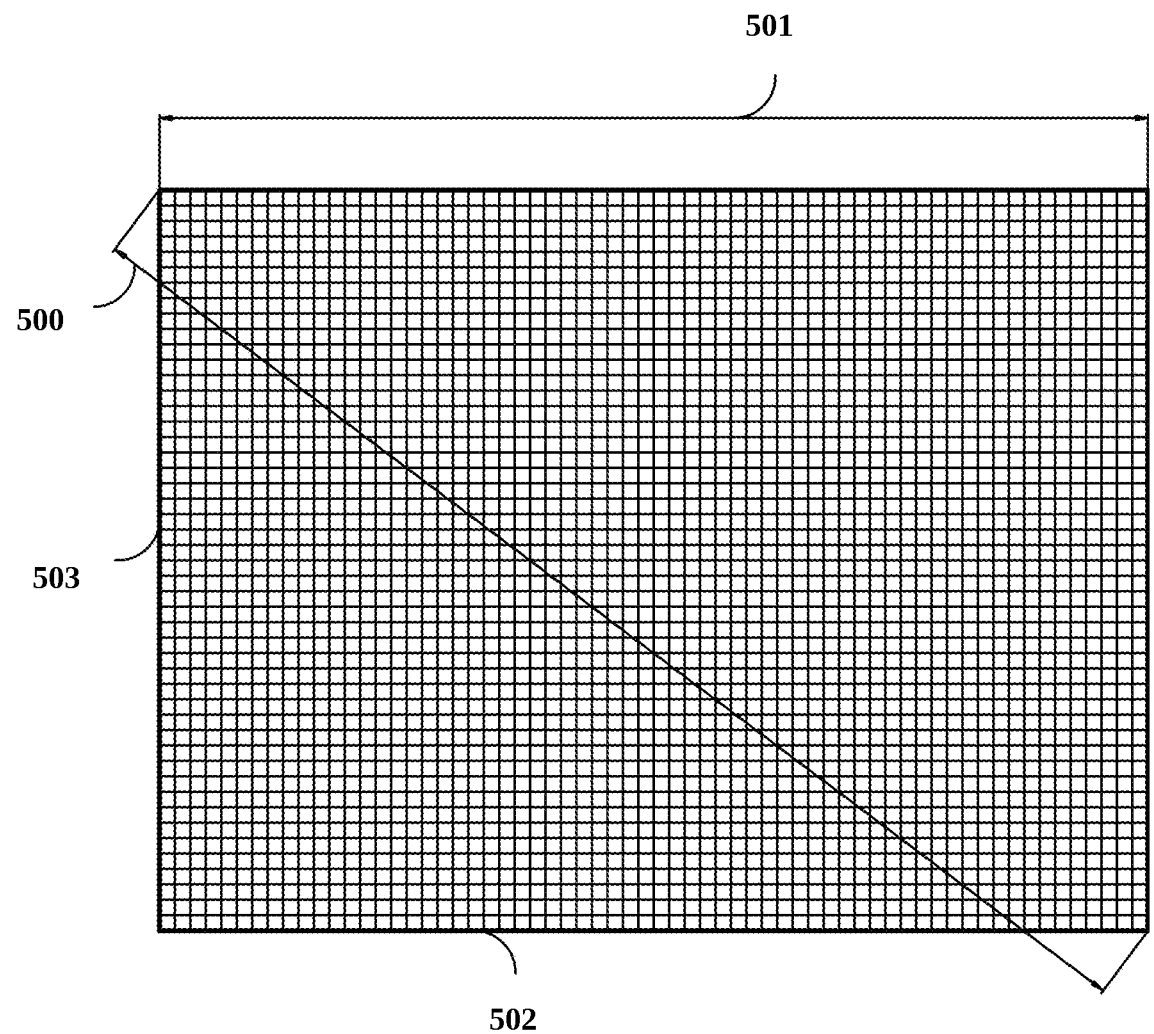
FIG. 5A: Optical Sensor

The purpose of the third method shown in Overview FIG. 3, Parallax Angle Estimation 302, is to estimate the parallax angle between left and right subject images given the sub-pixel registration estimate already estimated, in addition to standard optical sensor parameters. Additionally, the third method estimates the error variance of the parallax angle estimate. FIG. 5A illustrates the optical sensor along with standard optical sensor parameters comprising diagonal dimension 500, horizontal pixel resolution 502, and vertical pixel resolution 503.

The first step of method Parallax Angle Estimation 302 is to derive the horizontal dimension D subscript x 501 of the optical sensor from the standard optical sensor parameters diagonal dimension D 500, horizontal pixel resolution rho subscript x 502, and vertical pixel resolution rho subscript y 503, as shown in FIG. 5B Equation 504.

The second step of method Parallax Angle Estimation 302 is to derive the horizontal field-of-view FOV subscript x from the horizontal dimension D subscript x 501 of the optical sensor and the standard optical parameter focal length, as shown in FIG. 5B Equation 505.

The third step of method Parallax Angle Estimation 302 is to derive angular resolution per pixel rho subscript psi from the horizontal field-of-view FOV subscript x and the horizontal pixel resolution rho subscript x 502, as shown in FIG. 5B Equation 506.

The fourth step of method Parallax Angle Estimation 302 is to derive the parallax angle between left and right subject images from the angular resolution per pixel rho subscript psi 506 and the sum of integer pixel P subscript int and sub-pixel P subscript sub registrations, as shown in FIG. 5B Equation 507. Recall that integer pixel registration was defined in FIG. 4F Equation 449, and sub-pixel registration was defined in FIG. 4L Equation 495.

The fourth step of method Parallax Angle Estimation 302 is completed by estimating the error variance of parallax angle psi as the product of sub-pixel registration error variance FIG. 4L Equation 494 times a scale factor equaling the magnitude squared of the partial derivative of parallax angle psi with respect to sub-pixel registration P subscript sub, as shown in FIG. 5B Equations 508 and 509.

The fourth method shown in Overview FIG. 3, Line-of-Sight Range Estimation 303, comprises estimating a line-of-sight range estimate based on the parallax angle estimate FIG. 5B Equation 507 and the dual optical sensor spacing (delta), as shown in FIG. 6A Equation 600. Additionally, the fourth method comprises estimating the error variance of the line-of-sight range estimate as shown in FIG. 6A Equations 601 and 602.

FIG. 6B illustrates the line-of-sight range estimate geometry. The left optical sensor is located at position 603 and the right optical sensor is located at position 604. The left and right optical sensors are separated by a distance (delta) 605. The subject, whose line-of-sight range is to be estimated relative to the left optical sensor 603, is located at position 606. Angle 607 is the parallax angle (psi) subtended by the dual optical sensors relative to the subject position 606. Direction angle 608 (beta) measures the subject 606 direction relative to an axis collinear with left and right optical sensor positions 603 and 604, respectively, within a plane formed by left and right optical sensors 603 and 604 and subject 606. Thus, the line-of-sight range (r subscript LOS) 609 relative to the left optical sensor 603, is given by FIG. 6A Equation 600.

The error variance of the line-of-sight range estimate is obtained by summing the product of error variances for parallax angle (psi) and subject direction angle (beta) times the corresponding squared partial derivatives of line-of-sight range with respect to parallax angle (psi) and subject direction angle (beta), as shown in FIG. 6A Equations 601 and 602.

The fifth method shown in Overview FIG. 3 is Atmospheric Subject: Altitude & Range 304. The purpose of the fifth method is to estimate the altitude and horizontal range of a subject residing in air based on known measurements of the dual optical sensor's height above ground (h), depression/elevation angle (phi) and the estimate of the line-of-sight range (r subscript LOS) obtained in the fourth method 303, to compute error variances for all estimated quantities, and to report all information on a display for review by a user. The display can be a camera viewfinder, smart-phone display, generic computer display, augmented reality (AR) display, or heads-up-display (HUD) used for illustrating a subject under focus.

Figures 7D, 7E:
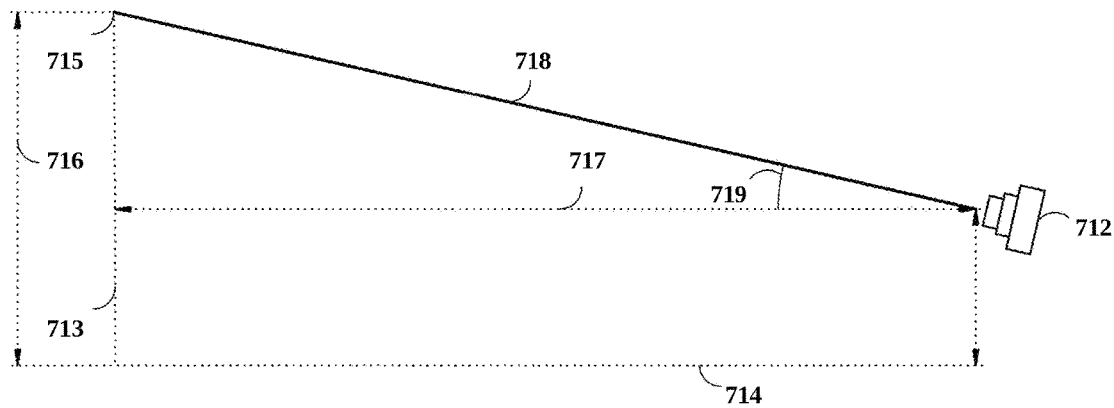
FIG. 7D: Range Estimate Error Variance Equations (Atmospheric Subject)
FIG. 7E: Problem Definition (Atmospheric Subject)

FIG. 7E illustrates the problem definition. A stereo-camera 712 with dual optical sensors is positioned at height (h) 713 above zero-altitude plane 714. The stereo-camera 712 captures left and right images of subject 715, which is at altitude (a) 716. Relative to the stereo-camera, the subject is positioned at a horizontal range (r) 717, line-of-sight range (r_LOS) 718, and depression/elevation angle (phi) 719.

The set of possible depression/elevation angles (phi) is defined by FIG. 7A Equation 700. The altitude estimate is given by FIG. 7A Equation 701. And the horizontal range is given by FIG. 7A Equation 702.

Additionally, the fifth method estimates error variances for altitude and horizontal range estimates in terms of the error variances of the underlying measurements and prior estimates on which they are based. The error variance for line-of-sight range is given by FIG. 7B Equation 602, the error variance for height, FIG. 7B Equation 703, is determined by user behavior, and the error variance for depression/inclination angle, FIG. 7B Equation 704, is determined by the error variance of a gyroscope output, sigma squared subscript G, that provides the depression/inclination angle measurement. The gyroscope can be a component of an inertial measurement unit (IMU).

The altitude estimate is derived from three inputs: the line-of-sight range estimate (r subscript LOS) and the measurements height (h) and depression/elevation angle (phi). So, the error variance of the altitude estimate is obtained by the summing over all inputs, the error variance for each input times a scale factor equaling the squared partial derivative of altitude with respect to said input, as given by FIG. 7C Equations 705, 706, 707, and 708.

The horizontal range is derived from two inputs: line-of-sight range estimate and depression/elevation angle. So, the error variance of the horizontal range estimate is obtained by summing over all inputs, the error variance for each input times a scale factor equaling the squared partial derivative of horizontal range with respect to said input, as given in FIG. 7D Equations 709, 710, and 711.

The sixth method shown in Overview FIG. 3 is Submersed Subject: Depth, Range & D/E Angle 305. The purpose of the fifth method is to estimate subject depth, horizontal range, slant-range, and depression angle for a subject submersed in a liquid such as water, or a plasma, to compute error variances for all estimated quantities, and to report all information on a display for review by a user. The display can be a camera viewfinder, smart-phone display, generic computer display, augmented reality (AR) display, or heads-up-display (HUD) used for illustrating a subject under focus.

Figure 8A:
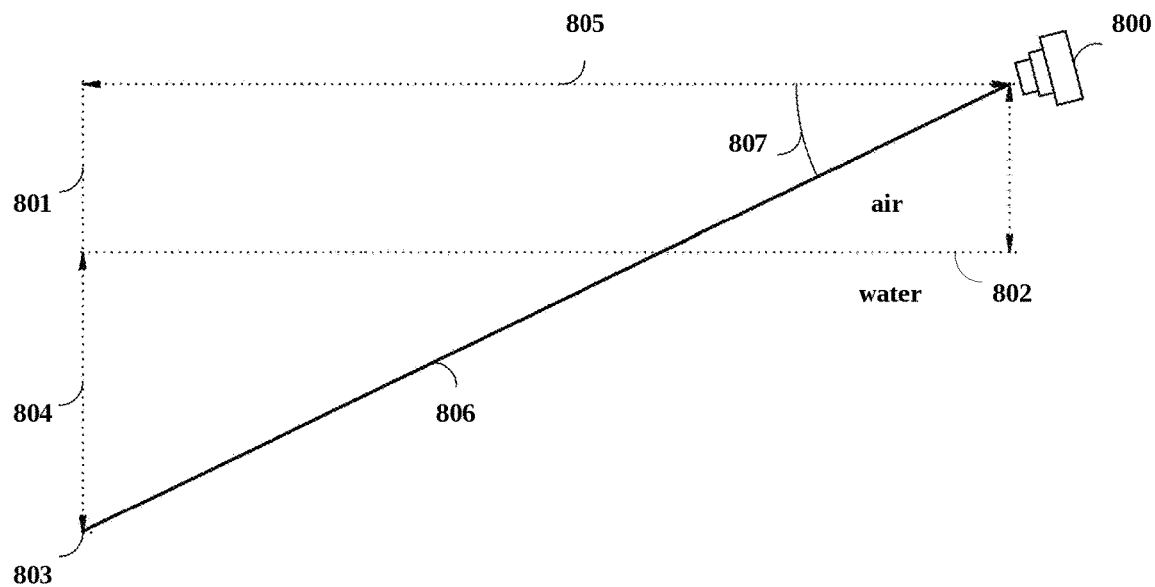
FIG. 8A: Problem Definition (Submersed Subject)

FIG. 8A illustrates the problem definition for the case where the subject is submersed in liquid water. A stereo-camera 800 with dual optical sensors is positioned at height (h) 801 above water surface 802. The stereo-camera 800 captures left and right images of subject 803, which is submersed at a depth (d) 804. Relative to the stereo-camera, the subject is positioned at a horizontal range (r) 805, slant-range (r_s) 806, and depression angle (phi) 807.

Figure 8B:
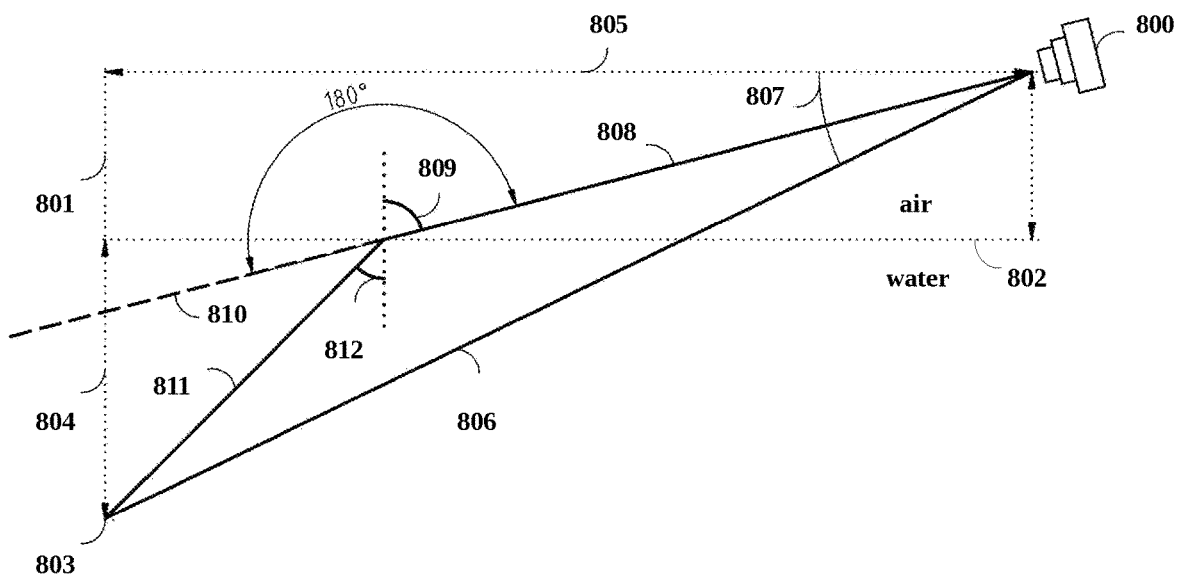
FIG. 8B: Application of Snell's Law (Submersed Subject)

FIG. 8B illustrates the application of Snell's Law. The stereo-camera 800 is oriented along a transmission range (r_t) 808 passing through air and making transmission angle (gamma_t) 809 with respect to the vertical axis at the point where a virtual subject image ray leaves water surface 802, wherein gamma_t 809 is between 0 and gamma_c 816, the critical angle, as shown in FIG. 8C Equation 813. Beyond the critical angle 816, total internal reflection occurs at water surface 802, and the subject is not visible to the stereo-camera system. The critical angle and the ratio of incidence (n_i) index of refraction (of water) to transmission (n_t) index of refraction (of air) are defined in FIG. 8C Equation 816. Stereo-camera 800 is oriented facing down at the (pi/2) complementary angle of transmission angle (gamma_t) 809, the apparent depression angle. The virtual subject image ray appears to travel toward the surface on virtual path 810, but actually travels on refracted path 811, wherein both paths have length equaling incidence range (r_i). Note that virtual path 810 and transmission range (r_t) 808 are collinear, as indicated by the 180 degree arc. The real path 811 makes angle (gamma i) 812 with respect to the vertical axis at the point where refracted subject image ray leaves the water.

The first step of method Submersed Subject: Depth, Range & D/E Angle 305 is to use line-of-sight estimate (r_LOS) and measurements height (h), transmission angle (gamma_t), indices of refraction for incidence (n_i) in water and for transmission (n_t) in air, to estimate the quantities transmission range (r_t) 808 with FIG. 8C Equation 814, incidence range (r_i) 810 with FIG. 8C Equation 815, incidence angle (gamma i) 812 with FIG. 8C Equation 817, depth (d) 804 with FIG. 8C Equation 818, horizontal range (r) 805 with FIG. 8C Equation 819, slant-range (r_s) 806 with FIG. 8C Equation 820, and depression angle (phi) 807 with FIG. 8C Equation 821.

The second step of method Submersed Subject: Depth, Range & D/E Angle 305 is to use error variances for line-of-sight range (r_LOS) estimate FIG. 8D Equation 602, and error variances for measurements height (h) FIG. 8D Equation 703, transmission angle (gamma_t) FIG. 8D Equation 822, and ratio of incidence to transmission index of refraction (n) FIG. 8D Equations 823-824, to estimate error variances for estimates depth (d), horizontal range (r), slant-range (r_s) and depression angle (phi). Note that the error variance for height (h) FIG. 8D Equation 703 is determined by user behavior and the error variance for transmission angle (gamma_t) FIG. 8D Equation 822 is derived from a gyroscope error variance, sigma squared subscript G, associated with a gyroscope that provides a measurement of the apparent depression angle, which is the (pi/2) complementary angle of transmission angle (gamma_t). Also, note that the error variance for ratio of incidence to transmission indices of refraction (n) 823 is itself an estimate based on a temperature dependence and barometric pressure dependence along with associated error variances. So, the error variance of estimate (n) 823 is obtained by summing the error variance of a temperature (T) measurement times the squared partial derivative of n 823 with respect to temperature (T) plus the error variance of a barometric pressure (B) measurement times the squared partial derivative of n 823 with respect to barometric pressure (B), as shown in FIG. 8D Equation 824.

Figure 8I:
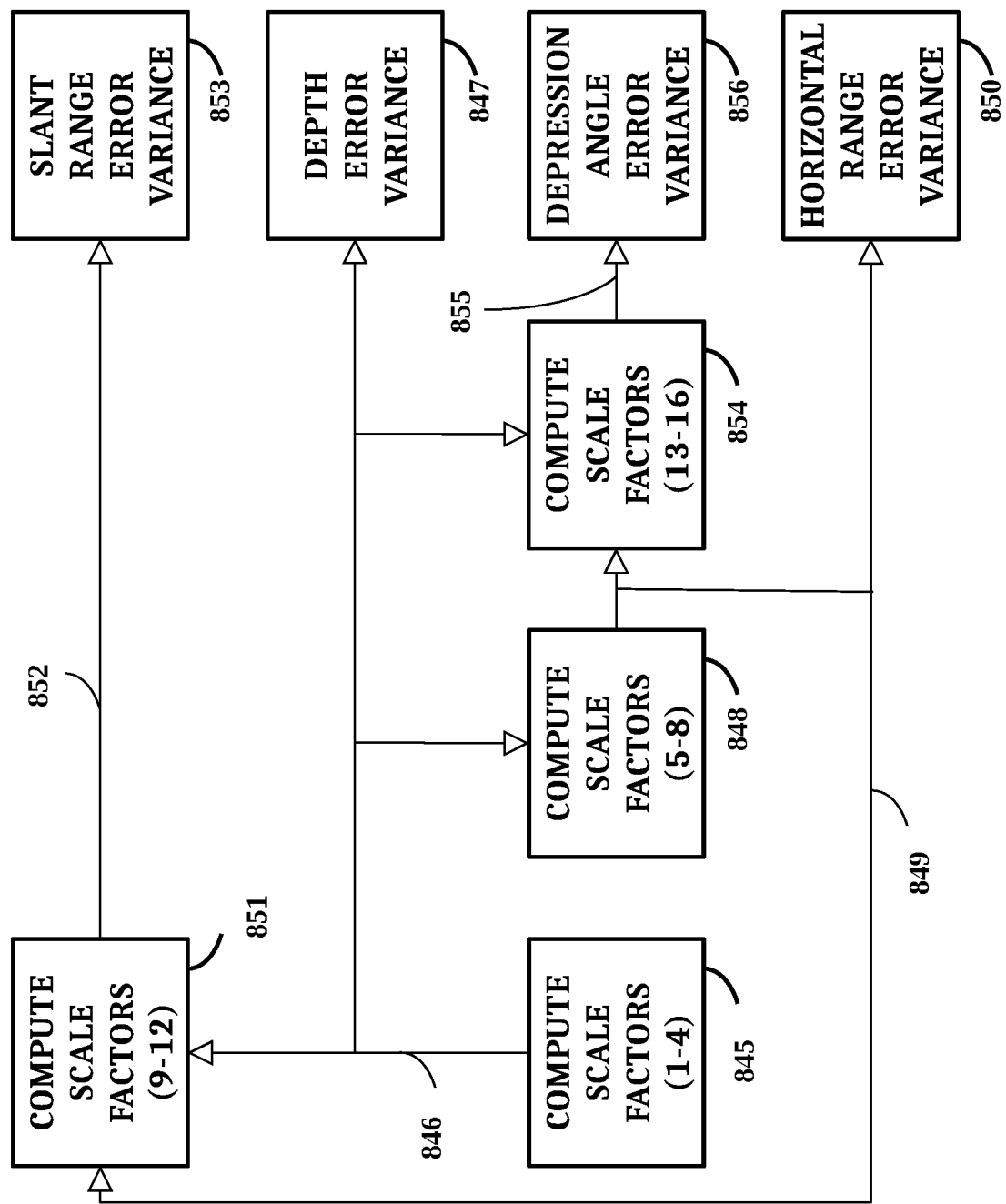
FIG. 8I: Estimation Error Variance Computation Structure (Submersed Subject)

The error variance of the depth (d) estimate is obtained by summing over all inputs line-of-sight range (r_LOS), height (h), transmission angle (gamma_t), and index of refraction ratio (n), the error variance for each input times the square of a scale factor equaling the partial derivative of depth (d) with respect to said input, as shown in FIG. 8E Equation 825; wherein it is assumed that each input is statistically independent from all other inputs. Using the chain rule, the partial derivatives of depth (d) with respect to inputs line-of-sight range (r_LOS), height (h), transmission angle (gamma_t), and index of refraction ratio (n), are given in FIG. 8E Equations 826, 827, 828, and 829, respectively. The present invention discloses a third computation structure, shown in FIG. 8I, for efficiently obtaining the error variance of the depth (d) estimate by computing first, second, third and fourth scale factors 846 using computation unit 845 for inputs line-of-sight range (r_LOS), height (h), transmission angle (gamma_t), and index of refraction ratio (n), respectively; wherein the squares of said first, second, third and fourth scale factors 846 are multiplied by error variances for line-of-sight range (r_LOS), height (h), transmission angle (gamma_t), and index of refraction ratio (n), respectively, and summed by depth error variance computation unit 847.

The error variance of the horizontal range (r) estimate is obtained by summing over all inputs line-of-sight range (r_LOS), height (h), transmission angle (gamma_t), and index of refraction ratio (n), the error variance for each input times the square of a scale factor equaling the partial derivative of horizontal range (r) with respect to said input, as shown in FIG. 8F Equation 830; wherein it is assumed that each input is statistically independent from all other inputs. Using the chain rule, the partial derivatives of horizontal range (r) with respect to inputs line-of-sight range (r_LOS), height (h), transmission angle (gamma_t), and index of refraction ratio (n), are given in FIG. 8F Equations 831, 832, 833, and 834, respectively. The third computation structure, shown in FIG. 8I, further comprises a computation unit 848 that computes fifth, sixth, seventh and eighth scale factors 849 for inputs line-of-sight range (r_LOS), height (h), transmission angle (gamma_t), and index of refraction ratio (n), respectively; wherein said fifth, sixth, seventh and eighth scale factors 849 are derived from said first, second, third and fourth scale factors 846, respectively; wherein the squares of said fifth, sixth, seventh and eighth scale factors 849 are multiplied by error variances for line-of-sight range (r_LOS), height (h), transmission angle (gamma_t), and index of refraction ratio (n), respectively, and summed by horizontal range error variance computation unit 850.

The error variance of the slant-range (r_s) estimate is obtained by summing over all inputs line-of-sight range (r_LOS), height (h), transmission angle (gamma_t), and index of refraction ratio (n), the error variance for each input times the square of a scale factor equaling the partial derivative of slant-range (r_s) with respect to said input, as shown in FIG. 8G Equation 835; wherein it is assumed that each input is statistically independent from all other inputs. Using the chain rule, the partial derivatives of slant-range (r_s) with respect to inputs line-of-sight range (r_LOS), height (h), transmission angle (gamma_t), and index of refraction ratio (n), are given in FIG. 8G Equations 836, 837, 838, and 839, respectively. The third computation structure, shown in FIG. 8I, further comprises a computation unit 851 that computes ninth, tenth, eleventh and twelfth scale factors 852 for inputs line-of-sight range (r_LOS), height (h), transmission angle (gamma_t), and index of refraction ratio (n), respectively; wherein said ninth, tenth, eleventh and twelfth scale factors 852 are derived from said first, second, third and fourth scale factors 846, respectively; wherein said ninth, tenth, eleventh and twelfth scale factors 852 are also derived from said fifth, sixth, seventh and eighth scale factors 849, respectively; wherein the squares of said ninth, tenth, eleventh and twelfth scale factors 852 are multiplied by error variances for line-of-sight range (r_LOS), height (h), transmission angle (gamma_t), and index of refraction ratio (n), respectively, and summed by slant-range error variance computation unit 853.

The error variance of the depression angle (phi) estimate is obtained by summing over all inputs line-of-sight range (r_LOS), height (h), transmission angle (gamma_t), and index of refraction ratio (n), the error variance for each input times the square of a scale factor equaling the partial derivative of depression angle (phi) with respect to said input, as shown in FIG. 8H Equation 840; wherein it is assumed that each input is statistically independent from all other inputs. Using the chain rule, the partial derivatives of depression angle (phi) with respect to inputs line-of-sight range (r_LOS), height (h), transmission angle (gamma_t), and index of refraction ratio (n), are given in FIG. 8H Equations 841, 842, 843, and 844, respectively. The third computation structure, shown in FIG. 8I, further comprises a computation unit 854 that computes thirteenth, fourteenth, fifteenth and sixteenth scale factors 855 for inputs line-of-sight range (r_LOS), height (h), transmission angle (gamma_t), and index of refraction ratio (n), respectively; wherein said thirteenth, fourteenth, fifteenth and sixteenth scale factors 855 are derived from said first, second, third and fourth scale factors 846, respectively; wherein said thirteenth, fourteenth, fifteenth and sixteenth scale factors 855 are also derived from said fifth, sixth, seventh and eighth scale factors 849, respectively; wherein the squares of said thirteenth, fourteenth, fifteenth and sixteenth scale factors 855 are multiplied by error variances for line-of-sight range (r_LOS), height (h), transmission angle (gamma_t), and index of refraction ratio (n), respectively, and summed by depression angle error variance computation unit 856.

The time-of-flight embodiment produces an optimal precision sub-sample resolution estimate of how many temporal samples have elapsed between transmission and reception of a known digital signal. To achieve this goal, time-of-flight embodiment inherits the computation structure and equations disclosed above relative to stereo-camera embodiment.

Figure 3B:
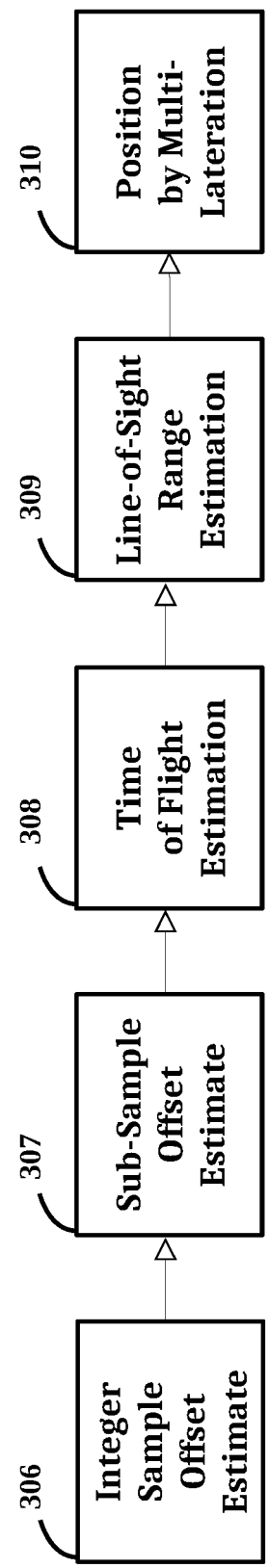
FIG. 3B: Overview (Time-of-flight)

An overview of the five methods performed by time-of-flight embodiment is shown in FIG. 3B.

The purpose of the first method Integer Sample Offset Estimate 306 is to produce a temporal, integer sample offset. A sliding window correlator, as is known in the art, operates on a transmitted reference signal and a received lagged signal stored in a signal storage buffer. The sliding window correlator indicates the integer sample offset between reference and lagged signals. Knowing the integer sample offset allows to align reference and lagged signals in method Sub-Sample Offset Estimate 307.

Figure 4O:
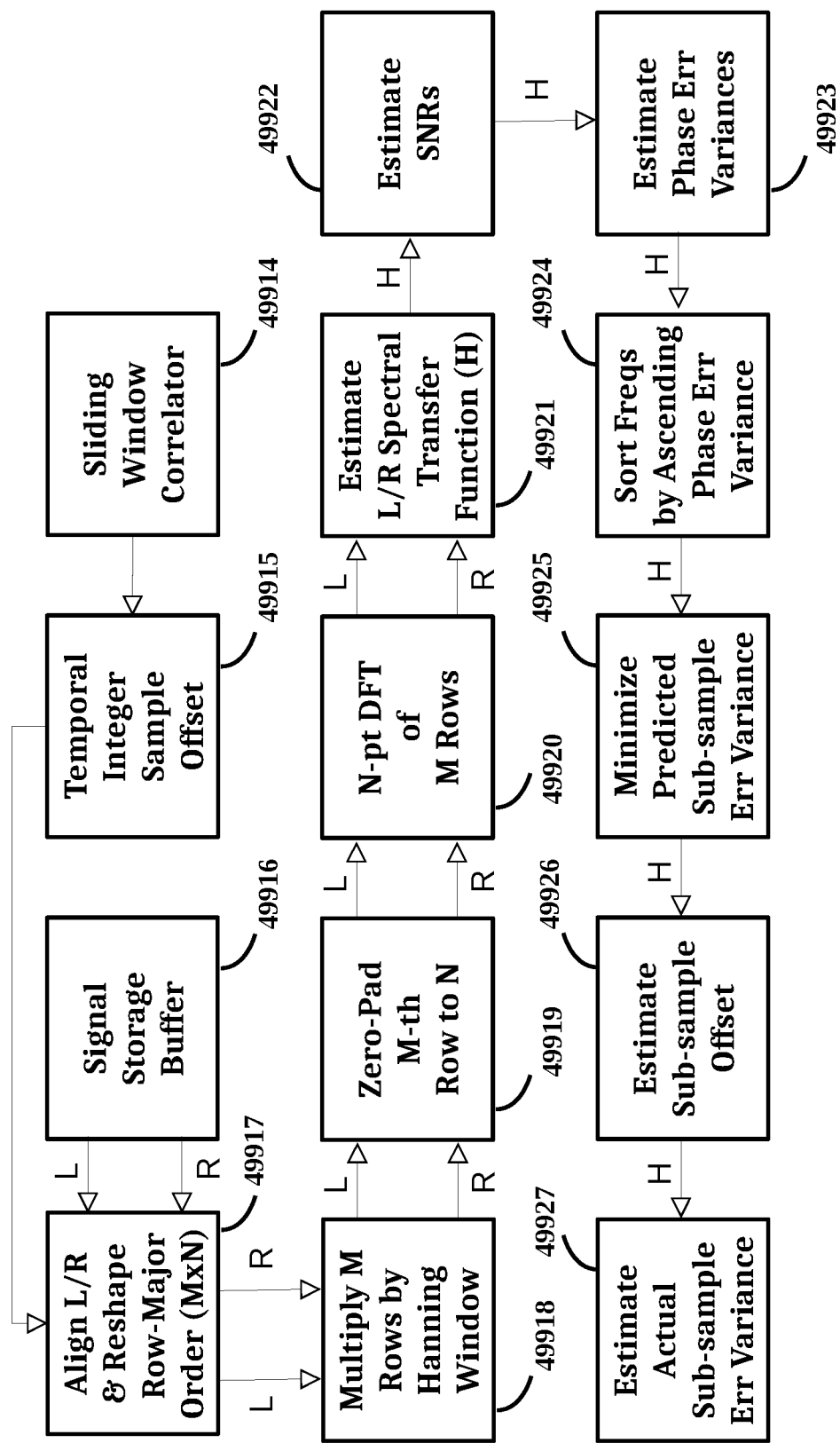
FIG. 4O: Sub-sample Offset Estimate (Time-of-flight)

The purpose of method Sub-Sample Offset Estimate 307 is to estimate the sub-sample offset between aligned reference and lagged signals. The steps in method 307 are illustrated in FIG. 4O. Sliding Window Correlator 49914 of method 306 provides input Temporal Integer Sample Offset 49915. In step Align L/R & Reshape Row-Major Order (M×N) 49917, integer sample offset 49915 is used to align reference (R) and lagged (L) signals stored in Signal Storage Buffer 49916. Also in step 49917, aligned reference and lagged signals are segmented and reshaped into contiguous rows to form respective matrices having M rows and N columns, wherein relative time index within a row increases with column index. The reshape operation follows row-major order, as is known in the art. In step Multiply M Rows by Hanning Window 49918, the rows of both reference and lagged signals are multiplied by a N sample Hanning window for the purpose of reducing spectral leakage in the forthcoming DFT. If the length of the aligned signals exceeds the product M times N, then the signals may be truncated. Otherwise, if the length of aligned signals is less than product M times N, then the M-th row is multiplied by a Hanning window of length N minus the number of deficient samples, and step Zero-Pad M-th Row to N 49919 inserts zeros in place of the deficient samples.

Steps N-pt DFT of M Rows 49920 through step Estimate Actual Sub-sample Error Variance 49927 proceed according to stereo-camera embodiment steps N-pt DFT of M Rows 413 through Estimate Actual Sub-Pixel Error Variance 420, respectively, as described above.

The purpose of method Time-of-flight Estimation 308 is to convert Integer Sample Offset 306 and Sub-Sample Offset Estimate 307 into a time-of-flight. To achieve this purpose, method 308 adds integer sample offset estimate 306 to sub-sample offset estimate 307 to produce a total non-integer sample offset. Next, method 308 divides the total non-integer sample offset by the sample rate (in units of Hz) to produce a time-of-flight.

The purpose of method Line-of-Sight Range Estimation 309 is to convert time-of-flight estimated in method 308 into line-of-sight range estimate. To achieve this purpose, method 309 multiplies time-of-flight by the propagation speed (c), corresponding to the speed of light or sound through the propagating medium.

The purpose of method Position by Multilateration 310 is to convert line-of-sight range estimated in method 309 into a position. Using multilateration technique, as is known in the art, method 310 combines its own line-of-sight range estimate, relative to a target, with those obtained by other cooperative, remotely positioned time-of-flight systems to estimate a position of the target.

Finally, time-of-flight embodiment is configured to compute error variances for all estimated quantities, and to report all information on a display for review by a user. The display can be a camera viewfinder, smart-phone display, generic computer display, augmented reality (AR) display, or heads-up-display (HUD) used for mapping the estimated target position.

Thus, the present invention discloses the best mode of direction and ranging methods for stereo-camera and time-of-flight systems, in comparison to the prior art, by providing optimal sub-sample estimate precision using a minimum variance linear phase estimation method, along with comprehensive error analysis and reporting. And notwithstanding that the above proceedings describe, to one of ordinary skill, the present best mode of practicing the present invention, additional modes and intended uses may become apparent to those of ordinary skill, based on the subject matter presented in the above proceedings. As such, the present invention should not be limited by the best mode set forth above, but should include all embodiments falling within the limitations, in spirit and scope, of the following claims.

What is claimed is:

1. A system for attaining optimal precision position determination; wherein said system comprises a time-of-flight system having a display, a central processing unit and a memory; wherein the memory comprises a signal storage buffer; wherein the central processing unit performs multiple method steps; wherein the method steps comprise determining an integer sample offset and a sub-sample offset between a reference signal and a lagged signal; wherein the method steps further comprise aligning the reference signal and the lagged signal using the integer sample offset and reshaping the reference signal and the lagged signal into contiguous rows of respective matrices arranged in an identical number of horizontal rows and vertical columns and stored in the signal storage buffer; wherein the method step for determining sub-sample offset comprises making a consistent estimate of a spectral transfer function relating the reference signal to the lagged signal, and defined over a plurality of frequencies, such that the error variance of the estimate of the spectral transfer function decays inversely with the number of horizontal rows; wherein the estimate of the spectral transfer function is used by a minimum variance linear phase estimation method to derive a consistent estimate of the sub-sample offset that achieves the globally minimum error variance, such that the error variance of the estimate of the sub-sample offset decays inversely as the number of horizontal rows increases, as the number of vertical columns increases, and as the signal-to-noise-ratio increases.

2. The system of claim 1, wherein the method steps further comprise determining a position estimate from the integer sample offset and sub-sample offset and reporting the position estimate on the display.

3. The system of claim 1, wherein the method steps further comprise determining, and reporting on the display, measurement and estimation error variances along side their respective measurements and estimates to provide a comprehensive precision analysis of all estimated quantities.

* * * * *